(12) United States Patent
Ozawa et al.

(10) Patent No.: US 8,409,671 B2
(45) Date of Patent: Apr. 2, 2013

(54) METHOD AND APPARATUS FOR FORMING RESIN FILM

(75) Inventors: Naoto Ozawa, Tokyo (JP); Takayuki Suzuki, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 750 days.

(21) Appl. No.: 12/439,583

(22) PCT Filed: Aug. 22, 2007

(86) PCT No.: PCT/JP2007/066229
§ 371 (c)(1),
(2), (4) Date: Mar. 2, 2009

(87) PCT Pub. No.: WO2008/029615
PCT Pub. Date: Mar. 13, 2008

(65) Prior Publication Data
US 2010/0028558 A1 Feb. 4, 2010

(30) Foreign Application Priority Data

Sep. 4, 2006 (JP) .................................. 2006-238930
Jul. 2, 2007 (JP) .................................. 2007-173921

(51) Int. Cl.
*B05D 3/00* (2006.01)

(52) U.S. Cl. .................... 427/553; 118/320; 118/620

(58) Field of Classification Search .................. 427/553; 118/620, 320
See application file for complete search history.

(56) References Cited

U.S. PATENT DOCUMENTS

2004/0134603 A1 * 7/2004 Kobayashi et al. ......... 156/272.8
2006/0153054 A1 * 7/2006 Kobayashi et al. ......... 369/275.1

FOREIGN PATENT DOCUMENTS

| JP | 9-147430 A | 6/1997 |
| JP | 09-161333 | 6/1997 |
| JP | 2003-091888 | 3/2003 |
| JP | 2004-127401 A | 4/2004 |
| JP | 2004-280927 A | 10/2004 |
| JP | 2005-317053 A | 11/2005 |
| JP | 2006-048828 A | 2/2006 |
| JP | 2006-190410 A | 7/2006 |
| JP | 2006-351103 | 12/2006 |
| JP | 2007-026517 A | 2/2007 |
| WO | 02/101737 A1 | 12/2002 |
| WO | 2005-118159 A1 | 12/2005 |
| WO | 2006-030494 A1 | 3/2006 |

OTHER PUBLICATIONS

Notice of Reasons for Rejection Issued to JP Application No. 2006-238930, Mailed March 30, 2010.
Notice of Reasons for Rejection Issued to JP Application No. 2007-173921, Mailed March 30, 2010.
Office Action Issued to Chinese Patent Application No. 200780032160.2, Mailed April 13, 2010.
International Search Report for PCT/JP2007/066229, Nov. 13, 2007.

* cited by examiner

*Primary Examiner* — Robert S Walters, Jr.
(74) *Attorney, Agent, or Firm* — Hoffmann & Baron, LLP

(57) ABSTRACT

A method for forming a resin film is provided in which a liquid material is cured by shifting irradiation of light from a central side to an outer circumferential side of a substrate during or after spreading a liquid material on the substrate by rotation, in which the light is annular, and an inner diameter and an outer diameter of the annular light are increased concentrically in relation to a central axis of rotation as irradiation time progresses, so that the annular light shifts from the central side to the outer circumferential side of the substrate.

13 Claims, 18 Drawing Sheets

METHOD AND APPARATUS FOR FORMING RESIN FILM

CROSS-REFERENCE TO RELATED APPLICATIONS

This application is a §371 of International Application No. PCT/JP2007/066229, filed Aug. 22, 2007, which claims the benefit of Japanese Application No. 2006-238930, filed Sep. 4, 2006 and Japanese Application No. 2007-173921, filed Jul. 2, 2007, the contents of all of which are incorporated by reference herein in their entirety.

FIELD OF THE INVENTION

The present invention relates to a method and an apparatus for forming a resin film, in which the method and the apparatus are suitable for forming an adhesive layer with a uniform film thickness between substrates such as in a case of an optical disc, or forming a resin film with a uniform film thickness on the substrate.

RELATED ART

Generally, an optical disc (next-generation optical disc) basically has a structure in which one or two recording layers are formed on a transparent resin substrate with a thickness of, for example, approximately 1.1 mm, and a transparent resin film is formed thereon for the protection thereof, or a structure in which two transparent resin substrates with a thickness of approximately 0.6 mm are adhered to each other by means of a transparent adhesive resin film. In this case, examples of those transparent substrates include one in which a signal recording layer is formed on one substrate only, or one in which signal recording layers are respectively formed on two substrates, and one in which the thickness of the two substrates are the same, or one in which a thin transparent sheet is used as a light transmission protective layer. Furthermore, there is also an optical disc with a structure in which four substrates are laminated by adhering two substrates with such an adhered structure by means of an adhesive. These structures are employed in various types of optical discs such as a write-once high-record-density optical disc, a write-once DVD, a read-only high-record-density optical disc, a read-only DVD, or a rewritable optical disc. Moreover, there is another case in which a plurality of substrates such as transparent glass and lenses are adhered together by means of an adhesive.

In such a case of an optical disc, generally, after two substrates are stacked with an adhesive therebetween, the adhesive is uniformly spread between the substrates, extra adhesive is shed by high-speed rotation of a spin coat method, and in the subsequent curing process, ultraviolet light is irradiated from one side or both sides of the substrate to cure the adhesive in a short time. Irradiation of ultraviolet light is performed in which the ultraviolet light is continuously irradiated for only a predetermined time by using a UV lamp, or the ultraviolet light is irradiated in pulses by using a xenon lamp. As another method for irradiating ultraviolet light, a method has been proposed in which a coating film is formed on the entire surface of the substrate by high-speed rotation, and then an ultraviolet spot light with a small irradiation area is irradiated sequentially from the inner side to the outer circumferential side while rotating the substrate at a low speed, thereby curing the coating film sequentially from the inner side thereof, which is formed on the entire surface of the substrate (e.g., see Patent Document 1).

While the method described in Patent Document 1 employs a spot light, there is another irradiation method similar to this method in which, when a liquid resin is being spread on the substrate by the spin coat method, an area of circular light is sequentially increased by using a mechanical irradiation range adjustment mechanism, thereby curing the coating film sequentially from the inner side (e.g., see Patent Document 2). Furthermore, a technique has already been proposed in which, when the coating film is being spread by the spin coat method, ultraviolet light is sequentially irradiated to a portion of the coating film that has reached a predetermined film thickness, so that the coating film does not move further to the outer side, thereby forming a uniform coating film with high accuracy (e.g., see Patent Document 3).

On the other hand, in a case where a transparent resin film is formed by the spin coat method, it is difficult to manufacture with a thickness that is uniform from the inner circumference to the outer circumference, and it is known that the outer circumferential side becomes thicker than the inner circumferential side (e.g., Patent Documents 4 and 5). In Patent Document 4, in order to solve this problem, a scheme is performed in which a radiation curable resin is applied to the entirety of the substrate, and then the rotation frequency of the substrate is accelerated, and radioactive rays are irradiated during the acceleration, thereby curing the radiation curable resin. In addition, when the radiation curable resin is cured while rotating the substrate in order to uniformize the thickness in the vicinity of the outer circumferential edge, burrs arise in the outer circumferential edge; therefore, the radioactive rays are prevented from being irradiated to the radiation curable resin in the outer circumferential edge. Moreover, the aforementioned Patent Document 5 discloses a manufacturing method in which, in a case of forming a transparent resin film by the spin coat method, the outer circumferential portion of the resin film, in which the thickness becomes greater than that of the inner circumferential portion, is covered by a mask, so that the radioactive rays are not irradiated thereto, and the outer circumferential portion of the resin film, having a thickness that becomes greater, is left uncured, and is planarized by the gravity. It should be noted that the outer circumferential portion of the resin film having a thickness that becomes greater may extend from the inside to the outside of the signal recording region in some cases, and may be formed in the outer circumferential region of the resin film corresponding to the outside of the signal recording region in some cases.

Patent Document 1: Japanese Unexamined Patent Application, First Publication No. 9-161333
Patent Document 2: Japanese Unexamined Patent Application, First Publication No. 2003-91888
Patent Document 3: Japanese Unexamined Patent Application, First Publication No. 2004-280927
Patent Document 4: Japanese Patent No. 3,742,813
Patent Document 5: Japanese Unexamined Patent Application, First Publication No. 2006-351103

SUMMARY OF THE INVENTION

The method described in Patent Document 1 achieves a method in which the spot light is helically irradiated to the coating film on the substrate, thereby helically and sequentially curing the coating film. As a result, at each time the spot light is helically irradiated, the edge portion of the spot light is irradiated to the inside edge of the coating film that has been cured by the spot light in the previous rotation, i.e. the portion is irradiated twice. This results in the coating film waving with the helical pattern, thereby causing problems in that the smoothness of the coating film is deteriorated, and helical lines are drawn in appearance. In addition, there is a disadvantage in that it takes time to cure the coating film. Since the method described in Patent Document 2 is a mechanical shutter method in which the outer diameter of the circular light is increased as the irradiation time progresses, thereby extending the light irradiation range, the light irradiation time in the inner circumferential side becomes longer than that in the outer circumferential side, causing a temperature difference between the inner circumference and the outer circumference, thereby leading to warping in the substrate. Moreover, in addition to the overall size increasing, not only does the weight increase, there are disadvantages such as that a cooling device for cooling the mechanical shutter is required. Particularly, since evenness with high accuracy is required in the next-generation optical disc, the occurrence of such warping is not negligible. Moreover, although the method described in Patent Document 3 is preferable in its intention to uniformize the film thickness of the liquid material on the entire surface of the substrate, disadvantages similar to those in Patent Documents 1 and 2 may arise in some cases.

The aforementioned Patent Document 4 does not describe a specific method for avoiding the irradiation of the radioactive rays to the radiation curable resin; however, in the aforementioned Patent Document 5, the outer circumferential portion is covered by a mask, whereby the radiation curable resin in the outer peripheral edge is prevented from being cured. However, in this method, when the radioactive rays are irradiated in the process of spreading the radiation curable resin by the spin coat method, the shed radiation curable resin adheres to the mask member and is cured; therefore, it is difficult to irradiate radioactive rays in the spreading process. Furthermore, in the methods of irradiating radioactive rays disclosed in Patent Documents 4 and 5, when irradiation of the radioactive rays is performed on the spin device, the shed radiation curable resin adheres to the inner wall of the spin device and is cured; therefore, there is a problem in that the radioactive irradiation process has to be performed in a position that is different from the position of the spin device. Moreover, in the method of blocking the light by the mask member, since the mask member cannot be made to contact with the radiation curable resin film, leaked radioactive rays are irradiated to the resin film, and due to the boundary region between the cured region and the uncured region of the resin film entering a semi-cured state, it has been difficult to uniformize the thickness of the resin film, even by performing a high-speed rotation process thereafter. Moreover, when the mask mechanism is provided, there are problems in that the apparatus not only becomes larger in size and more complicated, there is another problem in that the cost is increased.

Thus, the present invention provides a method and an apparatus for forming a resin film, with which the above-mentioned problems are solved, making it possible to form a resin film with a uniform thickness that is superior in smoothness, and making it possible to obtain a substrate that is superior in evenness without causing warping. Moreover, by employing annular light shifting toward the outer direction, it is possible to increase the irradiation efficiency, to decrease the size of the light source, and to reduce the cost. Furthermore, by controlling the intensity distribution of the light, a resin film is formed with a uniform film thickness without irregularities on the entire surface of the substrate.

According to the present invention, in a method for forming a resin film, during or after spreading a liquid material on a substrate or between substrates by rotating the substrate(s), irradiation of light is shifted from a central side to an outer circumferential side of a substrate(s), and the liquid material is cured, in which the light is annular light, and an inner diameter and an outer diameter of the annular light are concentrically increased in relation to a rotation center of the substrate(s) as irradiation time progresses, so that the annular light shifts from the central side to the outer circumferential side of the substrate(s).

Moreover, according to the present invention, in another method for forming a resin film, during or after spreading a liquid material on a substrate or between substrates by rotating the substrate(s), irradiation of light is shifted from a central side to an outer circumferential side of a substrate(s), and the liquid material is cured, in which a gradient of an intensity distribution of the light is moderate up far as the portion immediately before the set position where the irradiation of light is stopped, control is started immediately before the set position so that the gradient of the intensity distribution of the light becomes steep, then the light is controlled to have an intensity distribution with a predetermined steep gradient at the set position, thereby clarifying a boundary between the irradiated portion and the non-irradiated portion at the set position.

In an apparatus for forming a resin film according to the present invention, the apparatus includes: a substrate rotation mechanism for rotating a substrate(s), in which a liquid material for forming the resin film has been fed on the substrate or between the substrates; and a light-irradiating mechanism for curing the spread liquid material by irradiating annular light thereto during or after spreading the liquid material by rotation, the light-irradiating mechanism including: a light source for generating light to be irradiated to a light irradiated surface of the resin film; a control unit for controlling start and stop of irradiating the light; and a light-irradiating head that is provided with an annular-light-irradiating portion for changing the light from the light source into the annular light, in which the annular light is irradiated so that an inner diameter and an outer diameter of the annular light are concentrically increased in relation to a rotation center of the substrate(s) as irradiation time of the annular light progresses.

Furthermore, in another apparatus for forming a resin film according to the present invention, the apparatus includes: a substrate rotation mechanism for rotating a substrate(s), in which a liquid material for forming the resin film has been fed on the substrate or between the substrates; and a light-irradiating mechanism for curing the spread liquid material by irradiating light thereto during or after spreading the liquid material by rotation, the light-irradiating mechanism including: a light source for generating light to be irradiated to a light irradiated surface of the resin film; a control unit for controlling start and stop of irradiating the light; and an intensity distribution modification mechanism, by which the light is shifted from a rotation center side to an outer circumferential side of the substrate, so that the light with a moderate gradient is irradiated up far as a position immediately before the set position where the irradiation of light is stopped, the gradient of the intensity distribution of the light prevents irregularities from arising in the boundary between the irradiated portion and the non-irradiated portion, the light is controlled immediately before the set position so that the gradient of the intensity distribution of the light becomes steep, then the light is controlled to have an intensity distribution with a predetermined steep gradient at the set position, thereby clarifying a boundary between the irradiated portion and the non-irradiated portion at the set position.

According to the present invention, by making light irradiated to the substrate to be annular, the light is not irradiated to the portion for which the irradiation is not required, and the irradiation efficiency is improved. Moreover, annular light is used, and as the irradiation time thereof progresses, the inner diameter and the outer diameter of the annular light are extended from the inner circumferential side to the outer circumferential side on the substrate concentrically in relation to the rotation center of the substrate. As a result, it is possible to adjust the shifting speed or the light intensity of the annular light, to form a resin film with a uniform thickness by an appropriate method, and to obtain a substrate that is superior in evenness without causing warping.

Moreover, according to the present invention, it is possible to form a resin layer on the entire surface including the central surface area of the substrate, or on the entire surface excluding the central surface area of the substrate. In particular, the present invention is suitable for a case of employing the technique as described in the aforementioned Patent Document 3, for example, the method for curing a resin film by sequentially irradiating ultraviolet light to the substrate at each time when the liquid material, which has been fed to and spread on the substrate, reaches a predetermined film thickness. In this case, it is possible to obtain a resin film with a uniform film thickness that is superior in smoothness without causing warping.

Furthermore, according to the present invention, as the light to be irradiated to the light irradiated surface in order to uniformly cure the resin film, annular light, having a moderate gradient of radial intensity distribution, is irradiated starting from the inner circumferential side or the rotation center to the portion immediately before the set position where the irradiation of the annular light is stopped or interrupted, so that the cure shrinkage of the resin film is moderate, and the light is controlled so that the gradient of the intensity distribution of the annular light becomes steep from the portion immediately before the set position, whereby the boundary between the irradiated portion and the non-irradiated portion at the set position can be made distinct. Therefore, it is possible to improve the evenness of the resin film inside the set position, and since the light is not irradiated to the resin film outside the set position, it is possible to improve the evenness of the resin film outside the set position by performing another process.

DETAILED DESCRIPTION OF THE INVENTION

Figure 1:
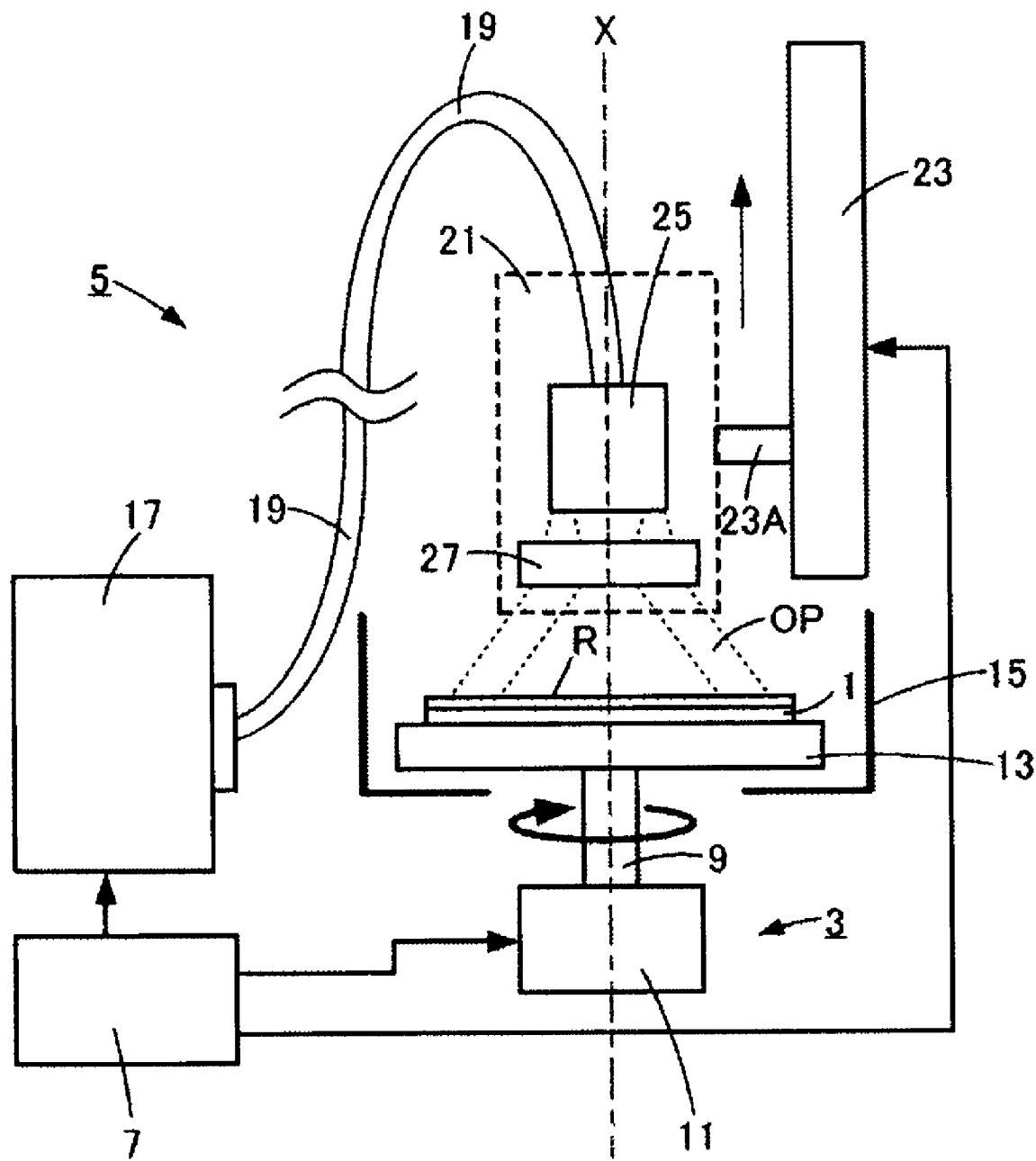
FIG. 1 is a diagram illustrating an apparatus for forming a resin film according to a first embodiment of the present invention.

Although a physical object to which the present invention is applied is not limited to a next-generation high capacity optical disc that is referred to as a blue-ray disc (Blu-ray Disc) or HD-DVD (High Definition DVD), unevenness of the thickness of the light transmission protective layer and the adhesive layer to be the cover layer is a significant problem in these next-generation high capacity optical discs in particular. In the case of Blu-ray Disc, the thickness of the light transmission protective layer consisting of an adhesive layer and a sheet, or the thickness of the light transmission protective layer consisting of only a transparent resin layer, is significantly thin at 0.1 mm; therefore, unevenness of the thickness of the adhesive layer or the transparent resin layer and warping of the substrate significantly affect the quality of the disc, and influence the quality of the next-generation high capacity optical disc. Moreover, in the case of HD-DVD, although the thickness of the substrates to be adhered to each other is 0.6 mm, which is the same as that of an ordinary DVD, the film thickness of the adhesive for adhering the substrates has to be uniform with sufficiently high accuracy, and the evenness of the thickness of the adhesive layer or the coating film and the reduction of warping have a great influence on the quality of the next-generation high capacity optical disc whatever the case. In addition, it is desired to further uniformize the film thickness of a resin film formed on other various types of substrates such as an ordinary DVD or a compact disc, and to reduce the warping of the substrate.

First, the basic concept of the present invention is described. In the present invention, in the process of spreading, by high-speed rotation, a liquid material fed onto a substrate such as a Blu-ray Disc or between substrates such as a DVD, an annular light beam is irradiated to a portion that has substantially reached a predetermined thickness of the resin film. An inner diameter and an outer diameter of the light beam are sequentially increased, so that a time integral value of the light energy on each surface area is substantially uniform on the entire surface to which the annular light beam is irradiated. The substantially uniform light energy is irradiated to all the surface area of the light irradiated surface of the resin film, a result of which warping does not occur in the substrate. In addition, the resin film is sequentially cured from the inner circumferential side at each time when the resin film reaches a predetermined thickness, thereby determining a substantially certain thickness, and the liquid material in the portion which has reached a predetermined thickness is prevented from migrating to the radially outward direction due to a subsequent high-speed rotation, thereby aiming at the uniformization of the film thickness of the liquid material and the planarization of the resin film on the entire surface of the substrate. It should be noted that the spread resin film can be cured also in a case where the light is irradiated after spreading the liquid material on the entire surface of the substrate. Moreover, in the process of spreading the liquid material on the substrate or between the substrates to the outer circumferential direction by a centrifugal force of a high-speed rotation, it is preferable for the annular light OP to be enlarged by synchronizing with the time when the resin film R reaches a predetermined thickness. It should be noted that the curing refers to a state in which the resin is cured to an extent that the resin film R does not move even partially to an outer direction by a centrifugal force of the high-speed rotation.

First Embodiment

Figure 2:
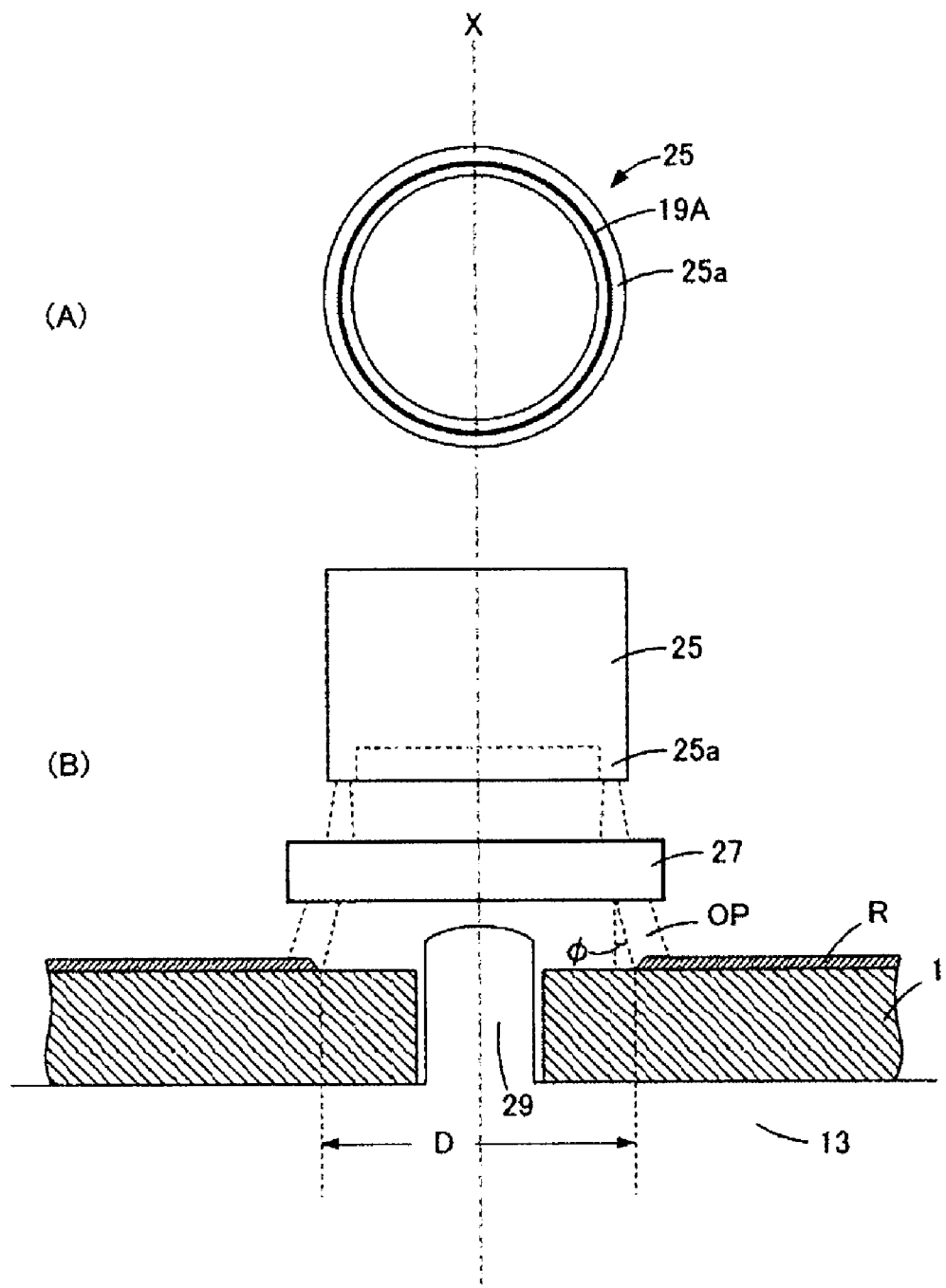
FIG. 2 is a plan view showing a light-irradiating portion of the apparatus for forming a resin film according to the first embodiment.
Figure 3:
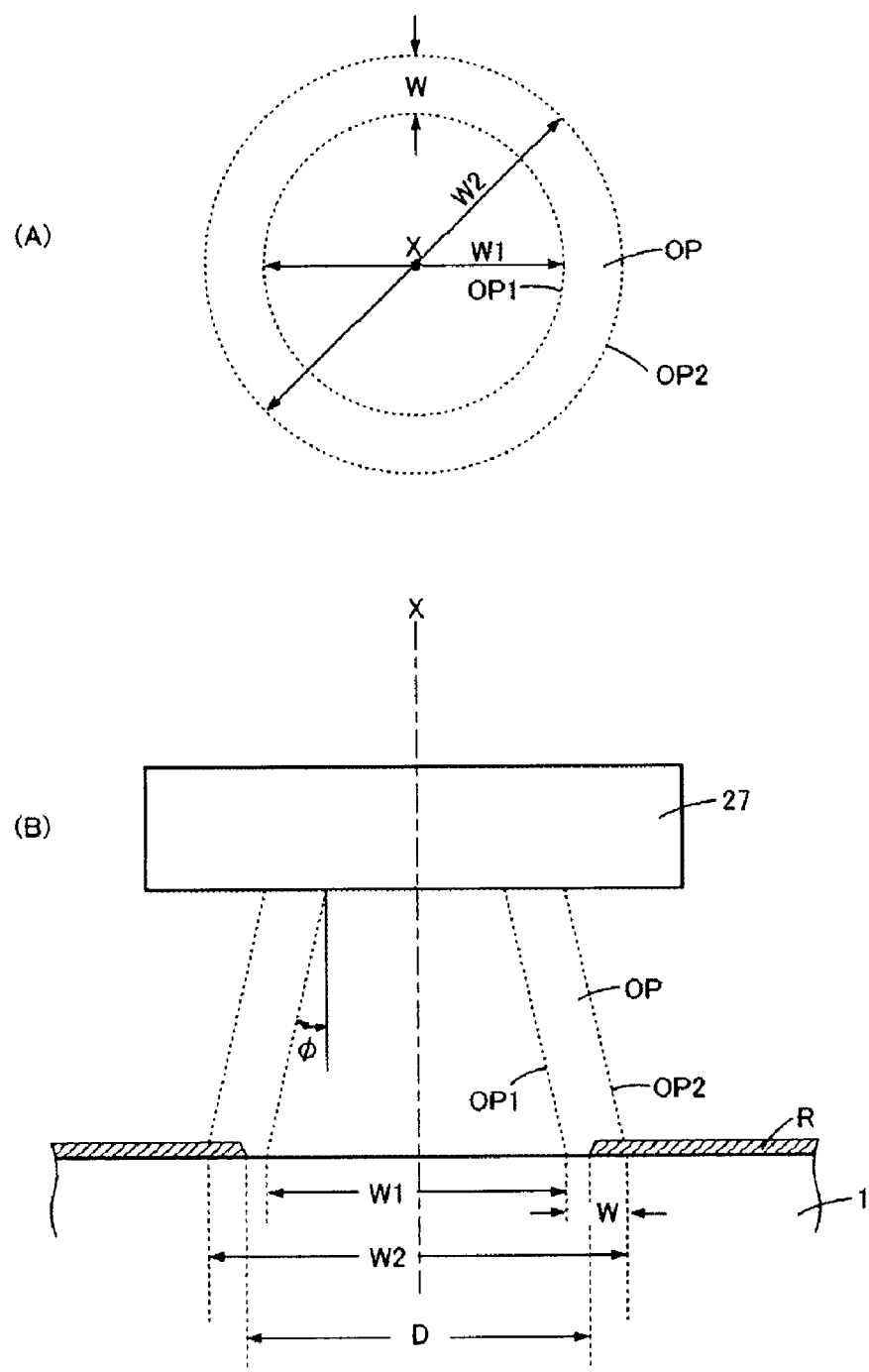
FIG. 3 is a diagram illustrating annular light to be irradiated to a substrate.
Figure 4:
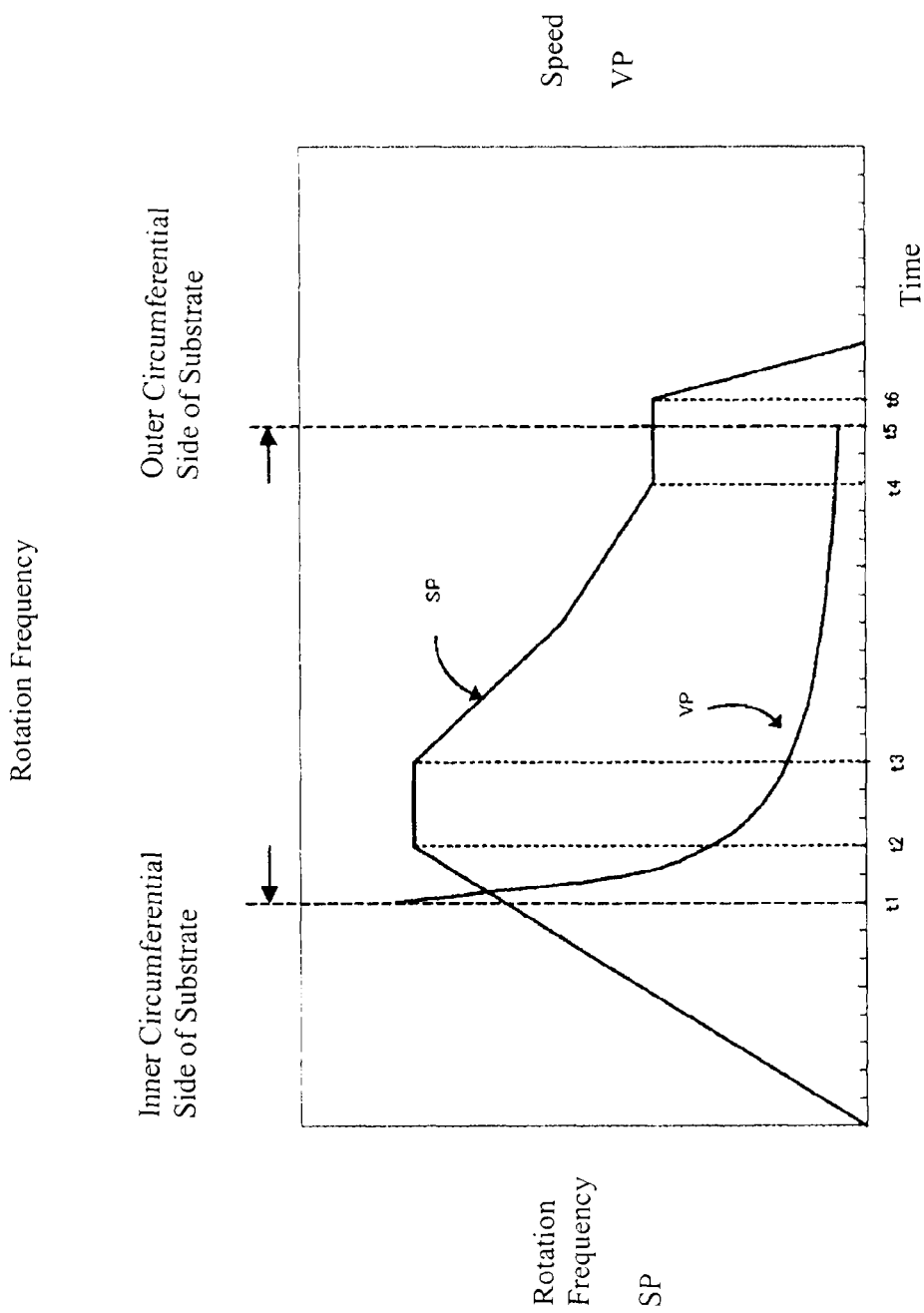
FIG. 4 is a diagram illustrating an example of a spin pattern of a substrate and an ascending speed of a light-irradiating head according to the present invention.

A method and an apparatus for forming a resin film according to a first embodiment of the present invention are described with reference to FIG. 1 to FIG. 4. FIG. 1 is a diagram illustrating an apparatus for forming a resin film according to the first embodiment of the present invention, and FIG. 2 is a diagram showing an underside of a light-irradiating portion. FIG. 3 is a diagram illustrating an annular light beam to be irradiated to a substrate, and FIG. 4 is a diagram illustrating an example of a spin pattern of a substrate and an ascending speed of a light-irradiating head. First, an outline of the apparatus for forming a resin film is described with reference to FIG. 1. This apparatus for forming a resin film is provided with a substrate rotation mechanism 3 for rotating a substrate 1 such as a next-generation large capacity optical disc on a rotation center X in accordance with a selected spin pattern, a light-irradiating mechanism 5 for irradiating annular ultraviolet light to the substrate 1, and a controlling mechanism 7 for controlling the substrate rotation mechanism 3 and the light-irradiating mechanism 5.

The substrate rotation mechanism 3 is referred to as a spinner, and consists of a rotational drive unit 11 that can rotate a rotational axis 9 in accordance with a spin pattern selected from a memory unit (not shown) of the control mechanism 7, a substrate receiving mount 13 fixed on a tip of the rotation axis 9, and a cover member 15 for preventing liquid material from scattering around. The substrate rotation mechanism 3 may be a general spinner. Although not shown, as an example, a rotation mechanism with a general configuration and a liquid material feeding mechanism are respectively provided at separate positions, and a blast nozzle of the liquid material feeding device annularly feeds the liquid material such as an ultraviolet curable resin to the substrate 1. The substrate 1, to which the liquid material has been fed, is transferred to the substrate receiving mount 13 by a transport mechanism (not shown). As an alternate example, a blast nozzle (not shown), which can revolve in a front-back direction in the drawing, may annularly feed the liquid material to the substrate 1 placed on the substrate receiving mount 13, as a matter of course. In this case, the blast nozzle (not shown) revolves to retreat before the light-irradiating mechanism 5 operates.

The light-irradiating mechanism 5 consists of an ultraviolet light source 17 for outputting ultraviolet light, an optical fiber cable 19 configured by bundling a lot of optical fibers, a light-irradiating head 21 for irradiating annular ultraviolet light (hereinafter referred to as annular light), and a head-lifting device 23 for vertically moving the light-irradiating head 21. The light-irradiating head 21 is positioned on a tip portion of the optical fiber cable 19, and consists of: an annular-light-irradiating portion 25 for irradiating annular light in which a small circular spot ultraviolet light is changed into the annular light by the cross section irradiated by a tip face of the optical fiber cable 19; a lens member 27 for orienting the annular light from the annular-light-irradiating portion 25 to the outer circumferential side at a predetermined angle phi in relation to the rotation center X, and the tip portion of the optical fiber cable 19. Here, the ultraviolet light source 17 and the optical fiber cable 19 constitute an ultraviolet-light-irradiating means. The head-lifting device 23 has a structure consisting of a linear driving member and the like that convert a rotational force of a motor (not shown) into a linear driving force, and vertically moves the light-irradiating head 21 by vertically moving a connecting portion 23A that connects the light-irradiating head 21 and the head-lifting device 23. Since the ascending speed of the light-irradiating head 21 determines the extending speed of the inner diameter and the external diameter of the annular ultraviolet light irradiated from the light-irradiating head 21, it is important and described later. The ascending speed of the light-irradiating head 21 is controlled by the control mechanism 7. It should be noted that, as the lens member 27, it is possible to use various types of lenses such as lenses with various shapes and a combination of a plurality of lenses, e.g., zoom lenses used in a general optical camera.

The control mechanism 7 stores, in memory (not shown), a plurality of spin programs (shown by a spin pattern SP in FIG. 4 as an example), which make it possible to obtain a desired film thickness for various conditions such as a type and a viscosity of a liquid material for forming a resin film, and performs such functions as: a rotation control function for controlling the rotation driving of the rotational drive unit 11; a light control function for controlling ON/OFF of the ultraviolet light source 17; and an ascension control function for controlling the ascending speed of the light-irradiating head 21 in accordance with an ascending speed program (shown as an ascending speed pattern VO in FIG. 4 as an example) for irradiating substantially uniform light energy to the entire surface of the substrate 1. Moreover, the spin programs and the ascending speed program are stored in the memory in the control unit, control the rotational drive unit 11 with the spin pattern SP that is read and selected by a selection instruction, and elevate the light-irradiating head 21 with the selected ascending pattern VP by means of the head-lifting device 23 or the connecting portion 23A. It should be noted that, as a matter of course, the spin programs and the ascending speed program may be configured to be respectively stored in the rotational drive unit 11 and the head-lifting device 23.

As shown in FIG. 2 (A), the annular-light-irradiating portion 25 is provided with an annular portion 25a at a light emission face side, and an optical fiber 19A is annularly arranged in the annular portion 25a. The tip portion of the optical fiber cable 19 is divided as a substantially conical or spindle-like shape at the annular-light-irradiating portion 25, and each of the tips of the optical fiber 19A is annularly arranged in such a way to be positioned on substantially the same plane at the annular portion 25a.

In one example, the lens member 27 performs actions of suppressing the scattering of the annular ultraviolet light emitted from the annular tip face of the optical fiber 19A in the annular-light-irradiating portion 25, and irradiating the light to the substrate 1 in such a way as to retain the width of the annular light OP to be as constant as possible. It is preferable for the lens member 27 to be a lens mechanism that combines a plurality of generally used lenses, and to have a lens structure which makes it possible to adjust the distance between lenses so that the aforementioned actions can be performed at the same time. In a case where the substrate 1 is an optical disc substrate, it is preferable for the distance between the lens member 27 and the substrate 1 to be in a range of 10 mm to 500 mm in view of efficiency of the annular light OP and the like. The annular light OP is tilted outward at a predetermined angle phi (e.g., 5 to 30 degrees) in relation to the rotation center X. When the light-irradiating head 21 is positioned at a set lower limit position, i.e. when the lens member 27 is positioned at a set lower limit position (for example, when the bottom face of the lens member 27 is positioned 10 mm above the substrate 1), the inner diameter of the annular light OP is determined so that the annular light OP is capable of irradiating the inner circumference of the resin film R extended on the substrate 1. For example, when the inner diameter of the resin film R is D as shown in FIG. 2 (B), the inner diameter of the annular light OP has to be smaller than the inner diameter D of the resin film R to some extent. Accordingly, by the light-irradiating head 21 being shifted upward from the lower limit position by the head-lifting device 23, the annular light OP that has been irradiated to the inner circumferential position of the resin film R is shifted toward the outer circumferential direction of the substrate 1. It should be noted that 29 shown in FIG. 2(B) is a center pin that is positioned at the center of the substrate receiving mount 13, and serves for positioning and the like of the substrate 1.

Moreover, in another example, the optical fiber 19 and the annular-light-irradiating portion 25 are not elevated but remain at a fixed position, and the lens member 27 having a zoom function configured by a plurality of lenses changes the angle phi of the annular light OP in relation to the rotation center X. For example, the lens member 27 is provided with a structure that is similar to a lens mechanism having a zoom function in an optical camera, and the lens distances between a plurality of lenses are adjusted, thereby changing the angle of the annular light OP in relation to the rotation center X, and enlarging the inner diameter and the outer diameter of the annular light OP. In this case, it is preferable to change the angle phi of the annular light OP in relation to the rotation center X in a range of not more than 60 degrees. As one example, the zoom function of the lens member 27 operates so that, in the process of spreading the liquid material on the substrate or between the substrates to the outer circumferential direction by a centrifugal force of a high-speed rotation, the resin film R is sequentially cured by the ultraviolet light at the time when the resin film R reaches a predetermined thickness, and the inner diameter of the annular light OP is enlarged by synchronizing with the time when the resin film R reaches the predetermined thickness, thereby sequentially determining the film thickness.

Next, operation of the apparatus for forming a resin film according to the first embodiment is described. First, the substrate 1 such as an optical disc substrate, to which a liquid material has been annularly fed, is placed on the substrate receiving mount 13, and is held by suction by the substrate receiving mount 13. The rotational drive unit 11 then rotates the substrate receiving mount 13 with a selected spin pattern, for example, the spin pattern SP shown in FIG. 4, thereby spreading the liquid material on the substrate 1. At the time t1 until which the rotation speed of the substrate receiving mount 13 is substantially linearly increased from zero to a high speed, i.e. at the time t1 when the inner circumference of the resin film R reaches a predetermined thickness, the ultraviolet light source 17 is turned on and outputs ultraviolet light. The ultraviolet light via the optical fiber cable 19 is changed into annular ultraviolet light at the annular-light-irradiating portion 25, and the annular light OP is irradiated from the lens member 27 of the light-irradiating head 21 at the set lower limit position to the inner circumference of the resin film R. At the same time, the control mechanism 7 controls the head-lifting device 23 with the ascending speed pattern VP corresponding to the selected spin pattern SP, and elevates the light-irradiating head 21 in accordance with the ascending speed pattern VP.

With this, the light-irradiating head 21 ascends along the rotation center X in accordance with the ascending speed pattern VP, i.e. moves away from the upper surface of the substrate 1, a result of which the inner diameter and the outer diameter of the annular light OP become larger. Here, as one example, in the spin pattern SP as shown in FIG. 4, the rotation speed of the substrate 1 linearly increases until the time t2, and then the rotation speed is held until the time t3. This rotation speed is, for example, at least 1000 rpm. During this period, the main spreading of the liquid material that has been fed to the substrate 1 is performed, the rotation speed of the substrate 1 is decreased during the period from the time t3 to the time t4, the rotation speed is held from the time t4 to the time t6, and the rotation speed is decreased toward zero at the time t6, thereby completing the pattern. At the time t5 before the time t6, the irradiation of the annular light OP is stopped, and the elevation of the light-irradiating head 21 is stopped as well. It should be noted that, although the resin to be used is not particularly limited, the absorption wavelength of the generally used ultraviolet curable resin is in the range of 200 to 400 nm, and such an ultraviolet curable resin is used in the first embodiment.

Here, as shown in FIG. 3, the inner diameter of the annular light OP is a diameter W1 of the light OP1 that is the innermost side of the annular light OP on the upper surface of the substrate 1, and is referred to hereinafter as the inner diameter W1. Moreover, the outer diameter of the annular light OP is a diameter W2 of the light OP2 that is the outermost side of the annular light OP on the upper surface of the substrate 1, and referred to is hereinafter as the outer diameter W2. In addition, (W2−W1)/2 is referred to as a width W of the annular light OP. Accordingly, as described above, when the lens member 27 is positioned at the set lower limit position, the inner diameter W1 of the annular light OP is smaller than the inner diameter D of the resin film R to some extent. In a case where the substrate 1 is an optical disc substrate, the smallest inner diameter W1 of the annular light OP is, for example, on the order of 10 to 15 mm. In this state, the innermost circumference of the resin film R is cured by the annular light OP. As the light-irradiating head 21 ascends along the rotation center X, the inner diameter W1 and the outer diameter W2 of the annular light OP become larger, and by shifting the annular light OP from the inner circumferential side to the outer circumferential side on the upper surface of the substrate 1 at a speed corresponding to the ascending speed of the light-irradiating head 21, the resin R is sequentially cured from the inner circumferential side to the outer circumferential side. Here, as shown in FIG. 4, the ascending speed pattern VP is a speed pattern in which the light-irradiating head 21 ascends with a relatively high ascending speed when the annular light OP is irradiated to an area with a relatively small area of the substrate 1 such as an optical disc, i.e. when the annular light OP is irradiated to the inner circumferential side, and the ascending speed of the light-irradiating head 21 is decreased as the annular light OP is shifted toward the outer circumferential side. More specifically, the speed of the light-irradiating head 21 is inversely proportional to the radius of the annular light OP.

In the first embodiment, as the light-irradiating head 21 ascends, the inner diameter W1 and the outer diameter W2 of the annular light OP become larger, and the irradiated area becomes larger with this, a result of which the energy per unit area of the irradiated annular light OP becomes smaller toward the outer circumferential side. Accordingly, in the first embodiment, an ascending speed pattern VP is used in which the ascending speed of the light-irradiating head 21 is decreased as the area irradiated by the annular light OP is increased, in order to uniformize an amount of light irradiation energy per unit area of the surface irradiated by the annular light. Moreover, the spin pattern SP may be used in combination therewith, where the rotation speed of the substrate 1 is decreased as the area irradiated by the annular light OP is increased.

With this spin pattern SP, the rotation speed of the substrate 1 is decreased as the time progresses after the irradiation of the annular light OP. Accordingly, from the inner circumferential side to the outer circumferential side, the spreading speed, i.e. the extending speed, of the liquid material is decreased, and the irradiation time of the annular light OP becomes longer. Moreover, with this ascending speed pattern VP, the ascending speed of the light-irradiating head 21 is decreased as the annular light OP shifts toward the outer circumferential side, a result of which the speed of extending the inner diameter and the outer diameter of the annular light OP is decreased, that is to say, the irradiation time of the annular light OP becomes longer. Accordingly, by selecting and combining the spin pattern SP and the ascending speed pattern VP, it is possible to substantially uniformize the irradiation energy of the annular light OP per unit area of the entire irradiated surface of the substrate 1, while the speed of extending the inner diameter and the outer diameter of the annular light OP is made substantially equal to the speed of the portion of the resin film R reaching a predetermined film thickness to shift from the inner circumferential side to the outer circumferential side. Therefore, according to the first embodiment, it is possible not only to form the resin film R with a uniform film thickness on the substrate 1, but also to obtain an optical disc and the like on which a resin film of high quality is formed without causing warping, because the heat distribution of the substrate 1 is substantially uniform.

In a modified example of the first embodiment, the control mechanism 7, which is not only for controlling ON/OFF of the ultraviolet light source 17, in addition to having the above-mentioned control function, has a control function for controlling the ultraviolet light source 17 in accordance with the light control pattern data consisting of the irradiation time and the irradiation intensity. By use of the light control pattern data, the input power of the ultraviolet light source 17 is controlled so as to increase the increasing rate of the light intensity of the annular light OP in proportion to the increasing rate of the irradiated area of the annular light OP on the substrate 1, i.e. in proportion to the increasing rate of the radius of the annular light OP. In this way as well, it is possible to substantially uniformize the amount of light irradiation energy per unit area of the surface irradiated by the annular light, and to obtain a substrate of high quality as in the case of the first embodiment. The irradiation energy per unit area of the substrate 1 is decreased as the annular light OP shifts toward the outer circumferential side of the substrate in accordance with the increase of the distance from the substrate 1. Accordingly, a spin program for a slow rotation speed and an ascending speed program for a slow ascending speed may be combined in order to compensate for the reduction of the irradiation energy. Moreover, as a matter of course, in a case where the light intensity of the annular light OP is increased, a combination may be performed with one or both the spin program and the ascending speed program as described above. It should be noted that the liquid material may be fed to the substrate 1 in a state where the substrate 1 is placed on the substrate receiving mount 13, while rotating the substrate receiving mount 13 at a low speed.

Second Embodiment

Figure 5:
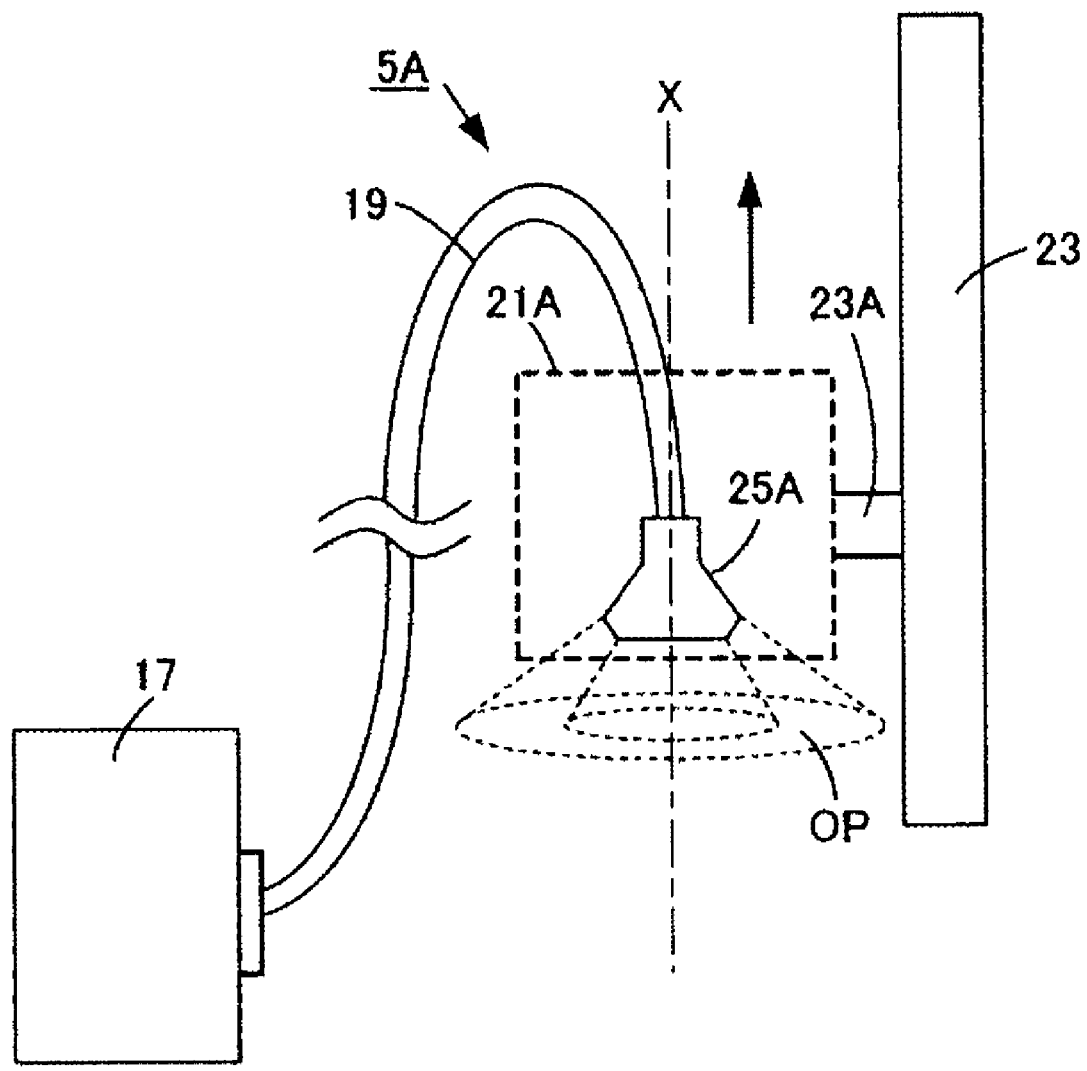
FIG. 5 is a diagram illustrating an example of a light-irradiating mechanism used in an apparatus for forming a resin film according to a second embodiment of the present invention.
Figure 6:
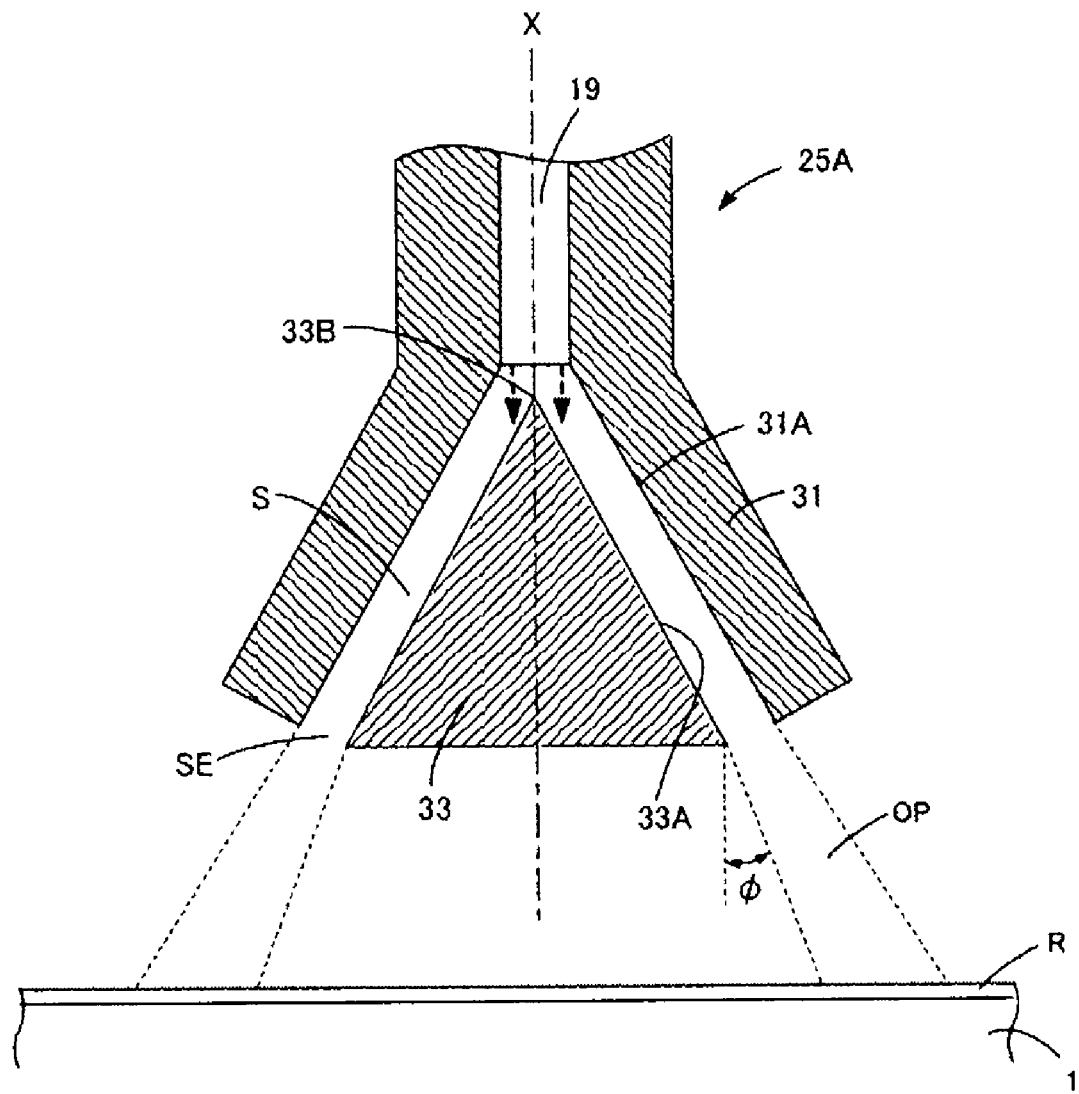
FIG. 6 is a diagram illustrating an example of an annular-light-irradiating portion of the light-irradiating mechanism.

A second embodiment of the present invention is described with reference to FIG. 5 and FIG. 6. FIG. 5 is a diagram showing an example of a light-irradiating mechanism used in an apparatus for forming a resin film according to the second embodiment, and FIG. 6 is diagram showing a partial cross section of an annular-light-irradiating portion 25A of a light-irradiating mechanism 5A. In FIG. 5 and FIG. 6, the reference numerals used in FIG. 1 to FIG. 4 indicate members with the same names. A light-irradiating head 21A as shown by a broken line is configured with the tip portion of the optical fiber cable 19 configured with a lot of optical fibers, and the annular-light-irradiating portion 25A, which consists of a first annular-light-forming portion 31 having a conical inner face 31A for retaining the center of the tip portion of the optical fiber cable 19 to be positioned on the rotation center X and for conically introducing the ultraviolet light emitted from the tip portion of the optical fiber cable 19, and a second annular-light-forming portion 33 having a conical outer face 33A for conically introducing the ultraviolet light in cooperation with the first annular-light-forming portion 31.

Each cross section part (cross section perpendicular to the page space) of the first annular-light-forming portion 31 and the second annular-light-forming portion 33 is concentrically arranged on the rotation center X, and an apex 33B of the second annular-light-forming portion 33 is positioned on the rotation center X. Between the conical inner face 31A of the first annular-light-forming portion 31 and the conical outer face 33A of the second annular-light-forming portion 33, there is a predetermined distance, for example, a uniform gap S of 0.5 to 3.0 mm, which forms a conical light path. The gap S forms an annular light irradiation line SE. The conical inner face 31A of the first annular-light-forming portion 31 and the conical outer face 33A of the second annular-light-forming portion 33 are specular surfaces, which do not easily absorb the ultraviolet light emitted by the tip portion of the optical fiber cable 19.

The central point of the ultraviolet light emitted by the tip portion of the optical fiber cable 19 is positioned on the apex 33B of the second annular-light-forming portion 33 that is positioned on the rotation center X, and the light is distributed to be substantially uniform and is introduced through the gap S between the conical inner face 31A of the first annular-light-forming portion 31 and the conical outer face 33A of the second annular-light-forming portion 33 substantially without attenuation. The ultraviolet light emitted from the tip portion of the optical fiber cable 19 travels straight through the entire gap S with a substantially uniform light intensity, and is emitted as the annular light OP from the light irradiation hole SE. This annular light OP is irradiated to the substrate 1 at an angle phi in relation to the rotation center X, and is shifted from the inner circumferential side to the outer circumferential side of the substrate 1 as the annular-light-irradiating portion 25 ascends with the ascension of the light-irradiating head 21A, and the resin film R is sequentially cured from the inner side to the outer side, as described in the first embodiment.

Since the ascending speed of light-irradiating head 21A and the like are similar to those in the first embodiment, a description thereof is omitted. It should be noted that, the control mechanism 7, the rotational drive unit 11 that is capable of rotating the rotation axis 9, the substrate receiving mount 13 that is fixed on the tip of the rotation axis 9, and the substrate 1 are similar to those in the first embodiment; therefore, these are omitted in FIG. 5. Moreover, although not shown, in the second embodiment as well, a lens portion may be attached to the bottom of the annular-light-irradiating portion 25A, and the annular light formed through the lens portion may be irradiated to the substrate 1 as a matter of course. The optical fibers of the tip portion of the optical fiber cable 19 may be uniformly distributed and then drawn to the middle of the gap S between the conical inner face 31A of the first annular-light-forming portion 31 and the conical outer face 33A of the second annular-light-forming portion 33 as a matter of course. The conical inner face 31A of the first annular-light-forming portion 31 and the conical outer face 33A of the second annular-light-forming portion 33 are not necessarily be conical, but may be parabolic, arc-shaped or hemispheric, and are not limited to those shapes in particular as long as a structure is provided in which the gap S of a predetermined distance is formed, and in which the annular light OP is irradiated to the substrate 1 at the angle phi in relation to the rotation center X.

Third Embodiment

Figure 7:
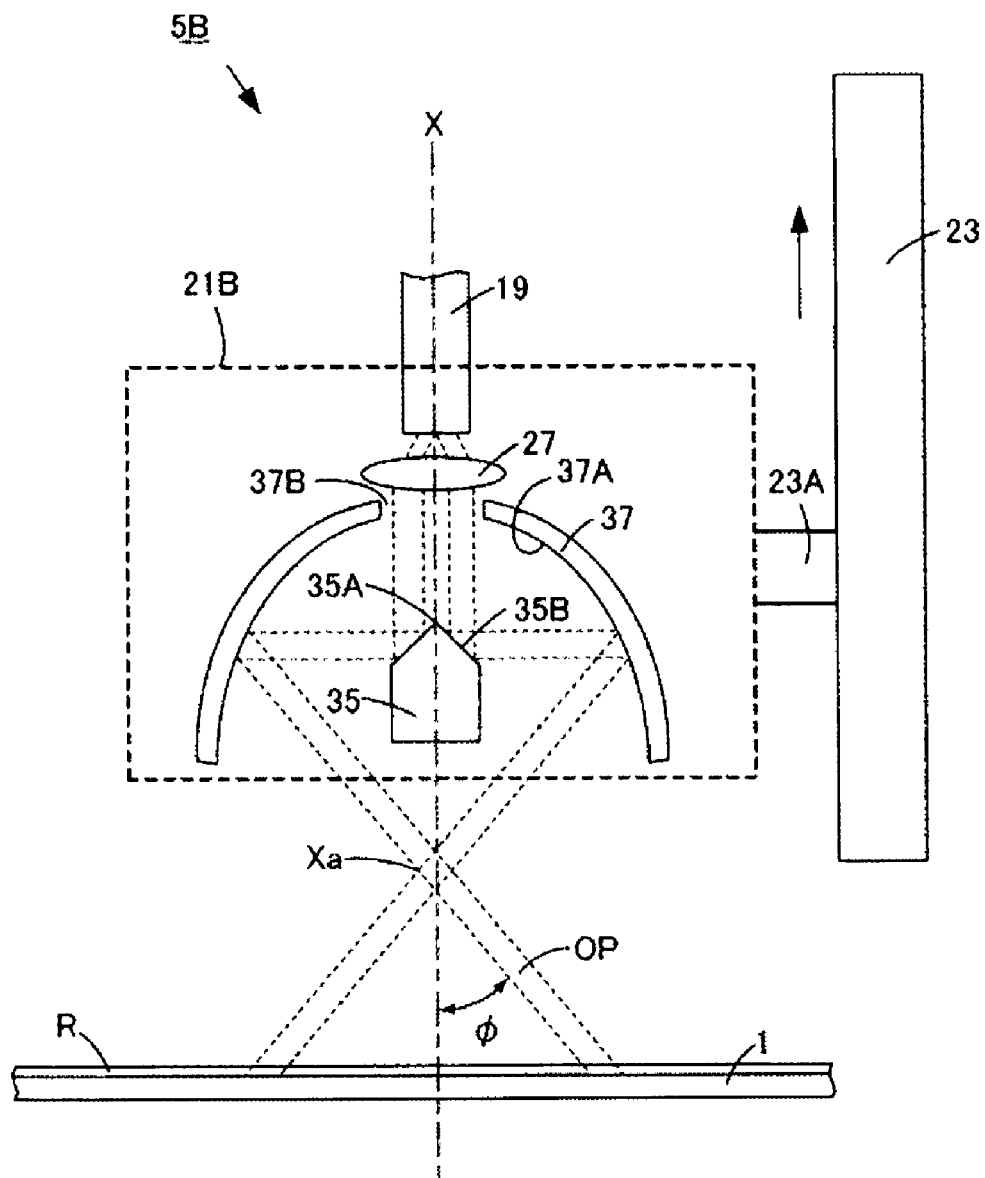
FIG. 7 is a diagram illustrating an example of the light-irradiating head used in the apparatus for forming a resin film according to a third embodiment of the present invention.

An apparatus for forming a resin film according to a third embodiment is described with reference to FIG. 7. In FIG. 7, the reference numerals used in FIG. 1 to FIG. 6 indicate members with the same names. The third embodiment is characterized in a light-irradiating head 21B shown by a broken line in a light-irradiating mechanism 5B, and is particularly characterized in that the annular light OP output from a light-irradiating head 21B is intersected and then irradiated to the substrate 1, and that the size of the light-irradiating head 21B is increased to make it possible to obtain annular light OP with a higher light intensity. The light-irradiating head 21B consists of the tip portion of the optical fiber cable 19, the lens member 27 arranged to face the vicinity of the tip face thereof, a first reflection member 35, and a second reflection member 37 arranged to surround the four sides of the first reflection member 35. The lens member 27 is, for example, a lens member referred to as a collimating lens in which the ultraviolet light output by the tip face of the optical fiber cable 19 is converted into parallel beams that do not diffuse, and are then irradiated to the first reflection member 35 through a central hole 37B of the second reflection member 37.

The first reflection member 35 is, for example, referred to as a cone mirror, which has an apex 35A and a conical reflection outer face 35B, in which the conical reflection outer face 35B receives the parallel beams from the lens member 27 and reflects the parallel beams to the second reflection member 37. The second reflection member 37 has a central hole 37B in the central portion of a hemispheric or elliptic reflection inner face 37A, and the reflection inner face 37A reflects the annular ultraviolet light from the first reflection member 35. At this time, the parallel beams from the reflection outer face 35B are annularly irradiated with a certain width to the reflection inner face 37A, and the ultraviolet light from the reflection inner face 37A becomes the annular light OP. Here, an inclination angle is set for the conical reflection outer face 35B of the first reflection member 35 and the hemispheric reflection inner face 37A of the second reflection member 37, so that the ultraviolet light is reflected from the reflection inner face 37A at a predetermined angle phi in relation to the rotation center X. The annular light OP from the reflection inner face 37A of the second reflection member 37 is intersected at an intersecting point Xa on the rotation center X, and then travels straight at the angle phi to be irradiated to the substrate 1. Thus, the annular light OP once becomes spot ultraviolet light at the intersecting point Xa on the rotation center X.

The operations of the third embodiment are mainly explained concerning points of difference from operations of the first and second embodiments. In a case where the substrate 1 is a glass plate, and the entire upper surface thereof is desired to be covered with the resin film R, the set lower limit position of the light-irradiating head 21B is set in the vicinity of the intersecting point Xa. After the liquid resin is fed to the central surface area of the substrate 1, the substrate 1 is rotated at a high speed as described above, and when the thickness of the resin film R on the substrate 1 reaches a predetermined thickness, the light-irradiating head 21B in the set lower limit position irradiates the spot ultraviolet light to the resin film R with the predetermined thickness in the central surface area of substrate 1. Thereafter, the light-irradiating head 21B ascends in accordance with the selected ascending speed pattern VP, a result of which the spot ultraviolet light becomes the annular light OP, and the inner diameter and the outer diameter thereof are further extended in accordance with the spreading of the liquid material, which is sequentially cured so as to sequentially determine the film thickness at each time when the resin film R reaches the predetermined thickness. Therefore, according to the third embodiment, it is possible to cure the entire surface including the central surface area of the resin film R by the irradiation energy of a substantially uniform time integral value, and to obtain a substrate with a high quality as in the case of the first embodiment. It should be noted that, by setting the set lower limit position of the light-irradiating head 21B in a position at which the ultraviolet light outputted from the light-irradiating head 21B becomes the annular light OP with a predetermined inner diameter on the substrate 1 as in the case of the first and second embodiments, it can be treated in the same way as the first and second embodiments, even in a case where the substrate 1 is an optical disc substrate.

Fourth Embodiment

Figure 8:
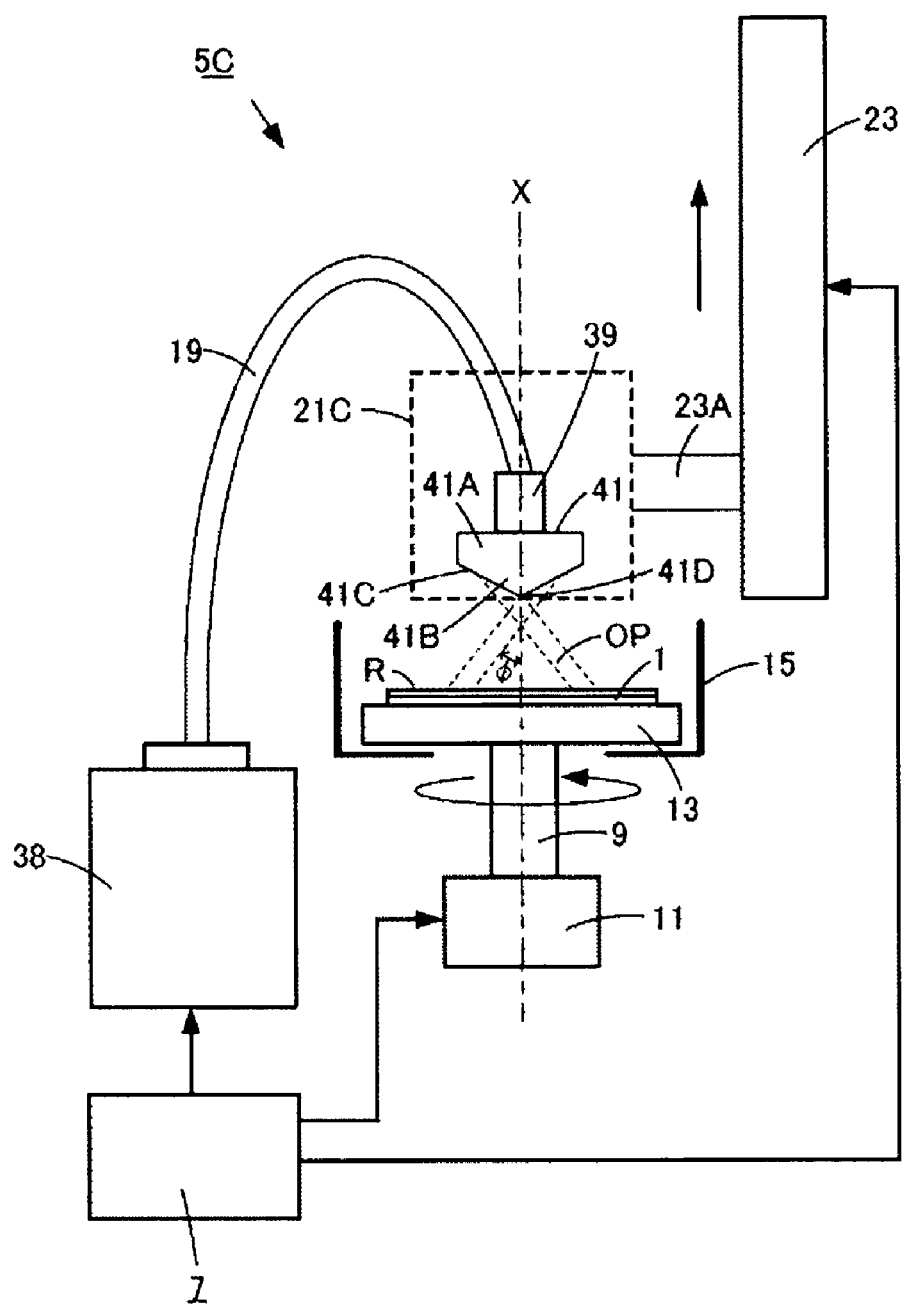
FIG. 8 is a diagram illustrating an apparatus for forming a resin film according to a fourth embodiment of the present invention.
Figure 9:
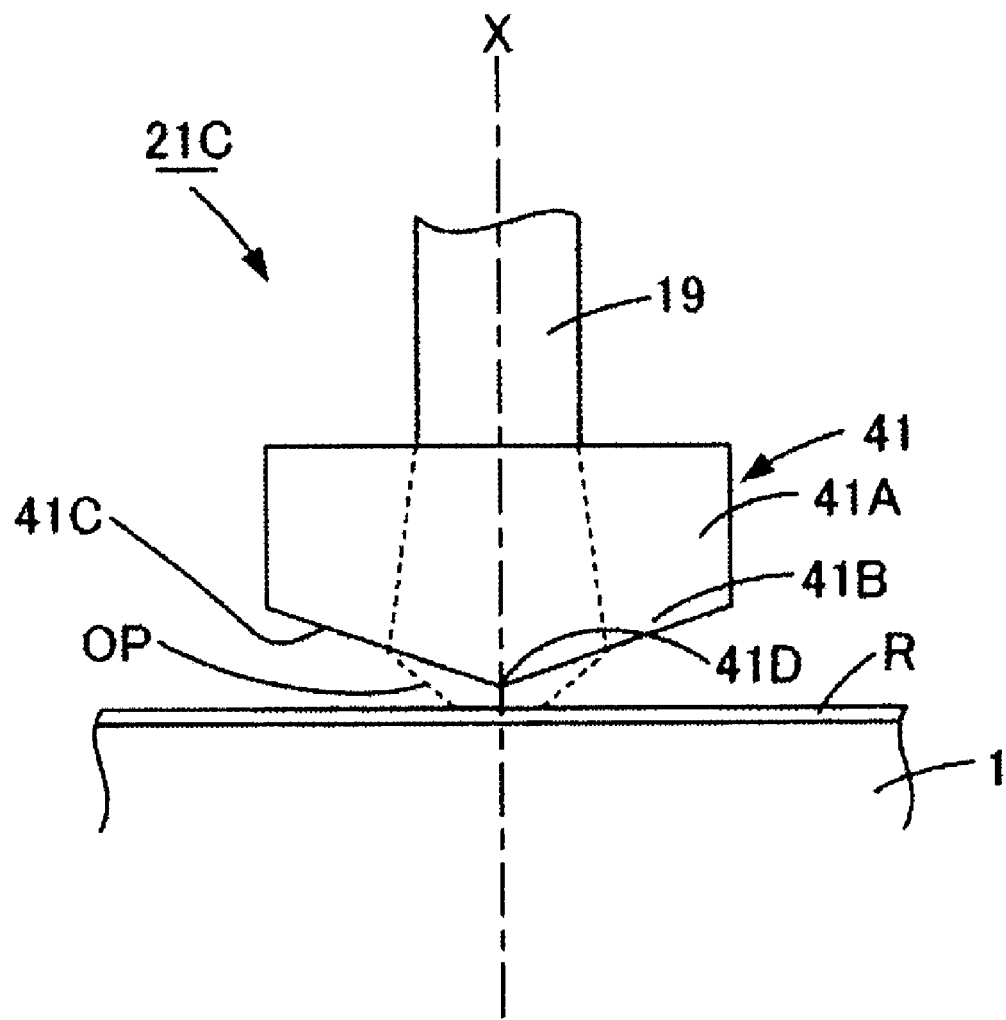
FIG. 9 is a diagram illustrating a light-irradiating head used in the apparatus for forming the resin film.

A fourth embodiment of the present invention is described with reference to FIG. 8 and FIG. 9. FIG. 8 is a diagram showing an example of a light-irradiating mechanism used in an apparatus for forming a resin film according to the fourth embodiment, and FIG. 9 is a diagram illustrating a light-irradiating head. In FIG. 8 and FIG. 9, the reference numerals used in FIG. 1 to FIG. 7 indicate members with the same names. As in the case of the third embodiment, the fourth embodiment is characterized in that it is possible to cope with either a case where a resin film is formed on the entire surface including the central surface area of the substrate 1, or a case where a resin film is formed excluding the central surface area of the substrate 1 such as an optical disc. Moreover, in the present embodiment, a laser source 38 for outputting an ultraviolet laser beam is provided, and the ultraviolet laser beam is passed from the laser source 38 to a light-irradiating head 21C of a light-irradiating mechanism 5C through the optical fiber cable 19. The light-irradiating head 21C consists mainly of the tip portion of the optical fiber cable 19, a terminal portion 39 fixed thereto, and a conical lens 41. The terminal portion 39 is made of a material that is superior in optical transparency for ultraviolet light, and supports the tip face of the optical fiber cable 19 in the same plane. The bottom face of the terminal portion 39 is in contact with the upper surface of the conical lens 41. The conical lens 41 consists of a short cylindrical portion 41A for receiving spot light with a cross section of a circular shape from the terminal portion 39, and a conical portion 41B extending to the underside thereof. The conical portion 41B outputs the annular light OP that is tilted toward the direction of the tilted surface thereof, i.e. that intersects at a predetermined angle phi on the rotation center X.

The ultraviolet laser beam outputted from the tip face of the optical fiber cable 19 is incident on the short cylindrical portion 41A of the conical lens 41 through the terminal portion 39, and the annular light OP is outputted from a conical face 41C of the conical portion 41B. The ultraviolet laser beam is shaped like a small circle on the conical face 41C with an apex 41d of the conical portion 41B as a center thereof, but becomes a light beam that is tilted in accordance with the angle of the tilted face of the conical face 41C of the conical portion 41B, intersects on the rotation center X, and then becomes the annular light OP extending at the angle phi. Here, immediately under the apex 41D of the conical portion 41B, the beam is a spot light with a cross section of a circular shape with the rotation center X as a center thereof. Accordingly, the fourth embodiment can cope with a case in which the substrate is a glass plate or the like, and in which the resin film R is desired to be formed on the entire surface including the central face of the upper surface thereof, as in the case of the third embodiment.

In a case where the substrate 1 is a glass plate, and the entire upper surface thereof is desired to be covered by the resin film R, the set lower limit position of the light-irradiating head 21C is set in a position at which the annular light output by the conical face 41C of the conical lens 41 becomes an ultraviolet laser beam with a cross section of a circular shape on the upper surface of the resin film R, as shown in FIG. 9. A liquid resin is fed to the central surface area of the upper surface of the substrate 1, the substrate 1 is placed on the substrate receiving mount 13, and when held by suction thereby, the control mechanism 7 operates the rotational drive unit 11 with the selected spin pattern SP. At the time when the thickness of the resin film R on the central surface area of the substrate 1 reaches a predetermined thickness while rotating at a high speed, the light-irradiating head 21C in the set lower limit position irradiates the ultraviolet light, which is a spot light with a cross section of a circular shape, to the central surface area of substrate 1. Thereafter, the light-irradiating head 21C ascends in accordance with the selected ascending speed pattern VP, a result of which the spot light irradiated to the central surface area of the resin film R becomes the annular light OP by the ultraviolet laser beam, and the inner diameter and the outer diameter thereof are further extended in accordance with the spreading of the liquid material, which is sequentially cured so as to sequentially determine the film thickness at each time when the resin film R reaches the predetermined thickness.

Therefore, according to the fourth embodiment, it is possible to cure the entire surface including the central surface area of the resin film R by the irradiation energy of a substantially uniform time integral value, and to obtain a high-quality substrate provided with a resin film with a uniform film thickness that is superior in smoothness, as in the case of the first embodiment. Moreover, in a case where the substrate 1 is an optical disc substrate, the set lower limit position of the light-irradiating head 21C is set in a position at which the annular light OP output from the light-irradiating head 21C becomes the annular light OP with a predetermined inner diameter on the substrate 1, as in the case of the first and second embodiments. It should be noted that, without using the optical fiber cable 19 and the terminal portion 39, an ultraviolet-light-irradiating means for outputting ultraviolet light such as an ultraviolet-light-irradiating lamp may be used to directly irradiate ultraviolet light from the ultraviolet-light-irradiating means to the conical lens 41, as a matter of course.

Fifth Embodiment

Figure 10:
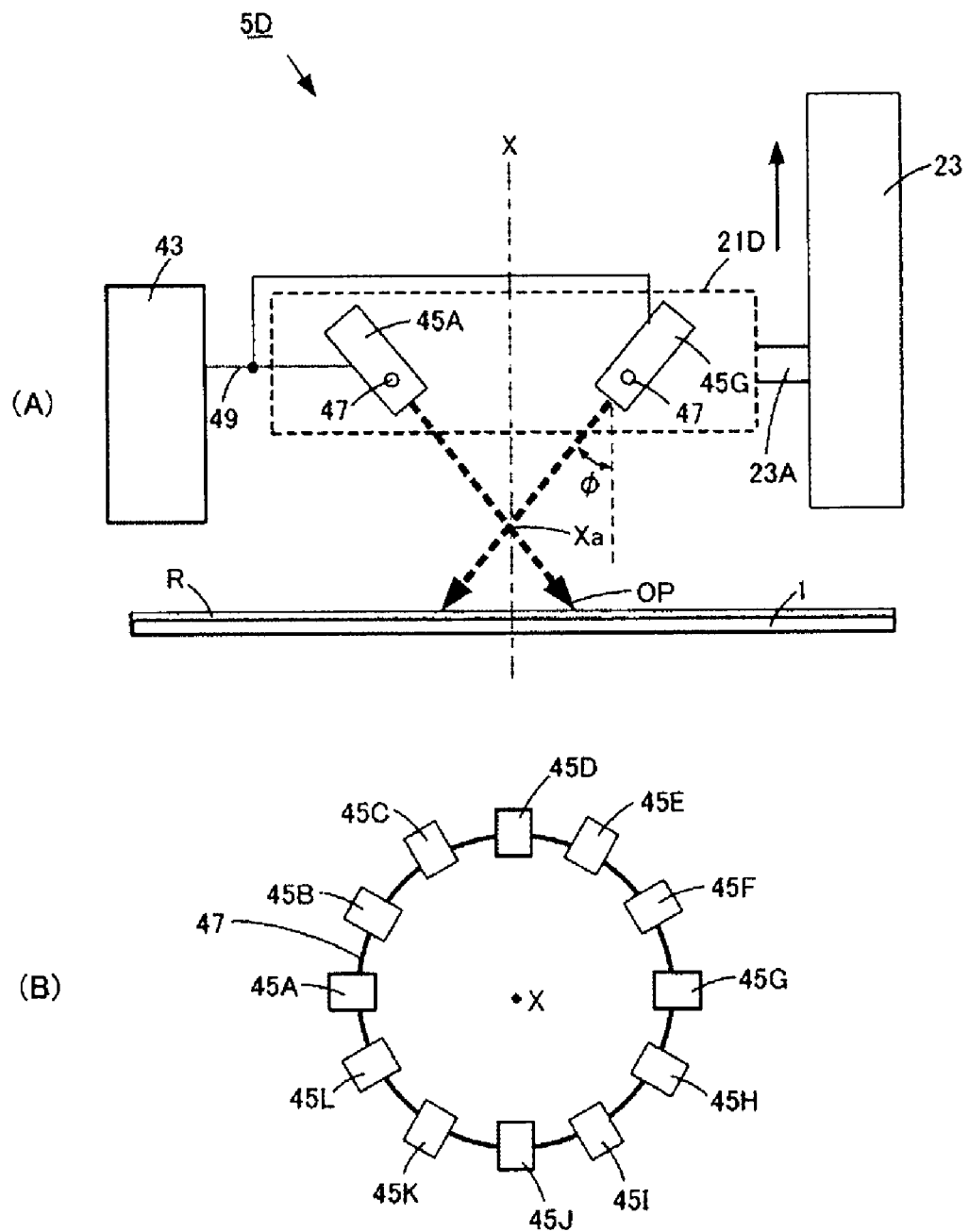
FIG. 10 is a diagram illustrating an example of a light-irradiating mechanism used in an apparatus for forming a resin film according to a fifth embodiment of the present invention.

Next, a fifth embodiment of the present invention is described with reference to FIG. 10. FIG. 10 is a diagram showing an example of a light-irradiating mechanism used in an apparatus for forming a resin film according to the fifth embodiment; FIG. 10 (A) is a diagram illustrating a light-irradiating mechanism 5D, and FIG. 10 (B) is a diagram illustrating an arrangement of a laser-beam-irradiating means of the light-irradiating mechanism 5D. In FIG. 10, the reference numerals used in FIG. 1 to FIG. 9 indicate members with the same names. The light-irradiating mechanism 5D consists of a laser electric power supply 43, a light-irradiating head 21D, and the head-lifting device 23 for vertically moving the light-irradiating head 21D. The fifth embodiment is different from the first to fourth embodiments in that the light-irradiating head 21D is a plurality of laser-beam-irradiating means 45A to 45L, each of which consists of an individual laser diode or a small laser tube for generating a laser beam mainly in an ultraviolet range. The laser-beam-irradiating means 45A to 45L are supported by an annular ring member 47 to enable angle adjustment in relation to the rotation center X. An angle in relation to the rotation center X may be fixed at a predetermined angle phi. The laser electric power supply 43 has a constant electric power control function for supplying substantially constant electric power to the laser-beam-irradiating means 45A to 45L, but may have an electric power control function for increasing the power supplied as the light-irradiating head 21D is elevated by the head-lifting device 23. Each of the laser-beam-irradiating means 45A to 45L is connected to the laser electric power supply 43 by means of wiring 49.

Since the annular light OP is formed by intersecting the laser beams outputted by the plurality of laser-beam-irradiating means 45A to 45L as an ultraviolet light radiation source in the fifth embodiment, in a case where the substrate 1 is an optical disc substrate, for example, it is possible to arrange a number of laser-beam-irradiating means 45A to 45L on a virtual circle with a diameter that is similar to or larger than the outer diameter of the optical disc substrate. Therefore, an effect provided whereby it possible to irradiate an annular laser beam with high power, and to irradiate greater irradiation energy per unit time to the substrate 1. It should be noted that, although there is a gap between each of the laser-beam-irradiating means 45A to 45L in FIG. 10 (B), the laser-beam-irradiating means may be arranged in close contact with each other without a gap, or may be doubly arranged so as to be in alternately dislocated positions, thereby making it possible to obtain the annular light OP with an even higher irradiation energy density.

As shown in FIG. 10 (A), the laser beams outputted by the laser-beam-irradiating means 45A and the laser-beam-irradiating means 45G, which are opposingly positioned to each other, intersect at the intersecting point Xa on the rotation center X and travel straight. The laser beams from the other laser-beam-irradiating means are the same way, and the laser beams respectively output by all of the laser-beam-irradiating means 45A to 45L travel straight toward the intersecting point Xa on the rotation center X, intersect each other, and then form the annular light OP on the upper surface of the substrate 1. Accordingly, when the set lower limit position of the light-irradiating head 21D is set so that the intersecting point Xa, at which the laser beams intersect, is positioned on the upper surface of the substrate 1, it is possible to uniformly cure the resin film formed on the entire surface including the central surface area of the substrate, as in the case of the third and fourth embodiments. Moreover, in a case where the substrate 1 is an optical disc substrate, the set lower limit position of the light-irradiating head 21D may be set so that the laser beams intersect at the point Xa and become the annular light OP with a predetermined inner diameter, and the annular light OP is irradiated to the upper surface of the substrate 1. The light-irradiating head 21D is elevated from the set lower limit position by the head-lifting device 23 with the selected ascending speed pattern VP, thereby making it possible to uniformly irradiate the area excluding a predetermined central surface area of the optical disc substrate without irradiating the laser beam thereto.

Sixth Embodiment

Figure 11:
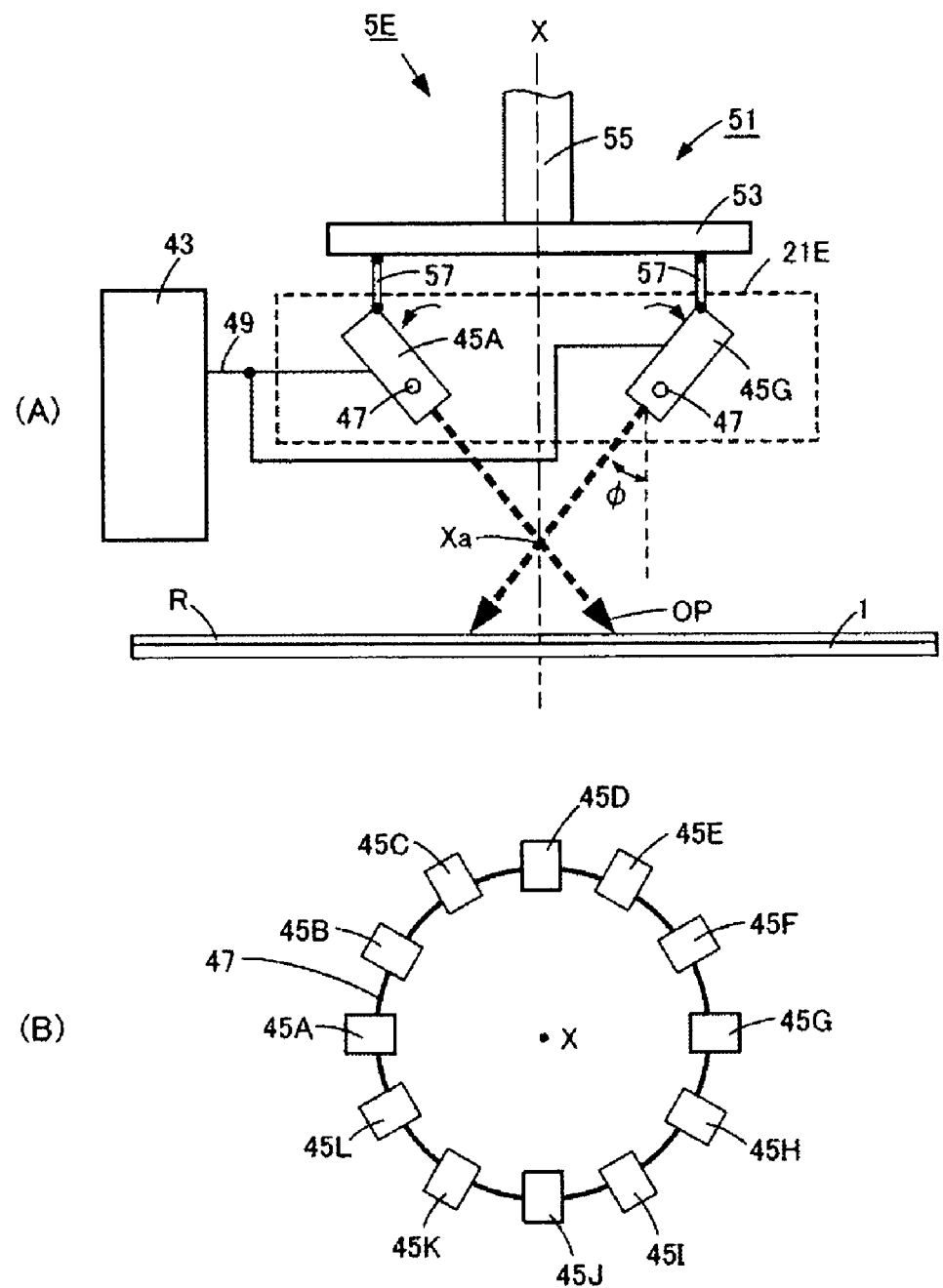
FIG. 11 is a diagram illustrating an example of a light-irradiating mechanism used in an apparatus for forming a resin film according to a sixth embodiment of the present invention.

Next, a sixth embodiment of the present invention is described with reference to FIG. 11. FIG. 11 is a diagram showing an example of a light-irradiating mechanism used in an apparatus for forming a resin film according to the sixth embodiment, FIG. 11 (A) is a diagram illustrating a light-irradiating mechanism 5E, and FIG. 11 (B) is a diagram illustrating an arrangement of a laser-beam-irradiating means of the light-irradiating mechanism 5D. In FIG. 11, the reference numerals used in FIG. 1 to FIG. 10 indicate members with the same names. Although the sixth embodiment is the same as the fifth embodiment in using the annularly arranged laser-beam-irradiating means 45A to 45L as an ultraviolet light radiation source, according to the sixth embodiment, it is not necessary to elevate the light-irradiating head 21E consisting of the laser-beam-irradiating means 45A to 45L in such a way as to separate from the substrate 1. This is different from all of the aforementioned first to fifth embodiments.

The laser-beam-irradiating means 45A to 45L are pivotally supported by the annular ring member 47 at regular intervals to make it possible to easily change the angle phi in relation to the rotation center X. An angle adjustment device 51 is provided in place of the head-lifting device 23 of the fifth embodiment. For example, in order to make it possible to change all the laser-beam-irradiating means 45A to 45L to be the same angle at the same time, the angle adjustment device 51 consists of a disc-shaped vertical motion member 53, a vertical driving member 55 for driving the vertical motion member 53 downward at a predetermined descending speed, and each arm piece 57 for mechanically connecting each end of the laser-beam-irradiating means 45A to 45L to the vertical motion member 53. Each arm piece 57 has the same length, and one end thereof is connected to the vertical motion member 53, while another end thereof is connected to each of the laser-beam-irradiating means 45A to 45L. In other words, both ends of each arm 57 are pivotally connected to the vertical motion member 53 and the laser-beam-irradiating means 45A to 45L, respectively, so that it is possible to freely change an angle in relation to the vertical motion member 53 and the laser-beam-irradiating means 45A to 45L.

In the sixth embodiment, as in the case of the fourth and fifth embodiments, without irradiating the laser beam to the predetermined central surface area of the substrate 1, it is possible to irradiate other areas so as to uniformize an amount of light irradiation energy per unit area of the surface to which the light is irradiated, and it is also possible to uniformly cure the resin film formed on the entire surface including the central surface area of the substrate 1. Therefore, this apparatus for forming a resin film can cope with either a case where the substrate 1 is one of various types of optical disc substrates in which a resin film is not formed on the central surface area, or a case where the substrate 1 is a glass plate in which the entire surface thereof is covered. When the vertical driving member 55 depresses the vertical motion member 53, a depressing force is exerted upon the laser-beam-irradiating means 45A to 45L through each arm 57. This depressing force generates the moment to each of the laser-beam-irradiating means 45A to 45L with the annular ring member 47 as a fulcrum thereof, and each of the laser-beam-irradiating means 45A to 45L is rotated in the direction of the arrow. With this, the angle phi of the laser beams respectively output by the laser-beam-irradiating means 45A to 45L in relation to the rotation center X becomes large, and the intersecting point Xa, at which the laser beams respectively output by the laser-beam-irradiating means 45A to 45L intersect, shifts upward along the rotation center X.

This increases the inner diameter and the outer diameter of the annular light OP on the substrate 1, having formed by the laser beam traveling straight through the intersecting point Xa. Accordingly, the angle phi of the laser-beam-irradiating means 45A to 45L in relation to the rotation center X is changed in accordance with an angle change pattern selected from an angle change program stored in the control mechanism 7 as described in FIG. 1, thereby making it possible to sequentially cure the resin film R at each time of reaching a predetermined thickness. It should be noted that the angle adjustment device 51 may change the angle phi in relation to the rotation center X, by applying a force in the radial direction to the laser-beam-irradiating means 45A to 45L arranged on a virtual circle, and by pulling the laser-beam-irradiating means 45A to 45L outwardly. Moreover, the individual laser-beam-irradiating means 45A to 45L may be configured to be driven by each driving member (not shown). It should be noted that, although preferable examples have been described for forming the annular light OP by the laser beam in the aforementioned fifth and sixth embodiments, it is not necessarily a laser beam, and it may be ordinary ultraviolet light. In this case, the laser-beam-irradiating means 45A to 45L may be a plurality of separate light-irradiating means such as a combination of a lens and a light emitting diode (LED) or a small lamp bulb.

In the aforementioned first to fourth embodiments, the ultraviolet light source 17 is arranged in a position that is different from positions of the light-irradiating heads 21, 21A to 21C, and the ultraviolet light generated by the ultraviolet light source 17 is introduced to the light-irradiating heads 21, 21A to 21C through the optical fiber cable 19; therefore, there is no need to cool the light-irradiating heads 21, 21A to 21C in particular. This is significantly preferable, because it is possible to reduce the size and weight of the light-irradiating heads 21, 21A to 21C, a result of which the driving electric power is reduced, and the speed of operational response of the light-irradiating heads 21, 21A to 21C is enhanced. However, for example, although a forced cooling means becomes necessary, a configuration may be employed in which an ultraviolet-light-irradiating lamp (not shown) is used as the ultraviolet light source 17, and annular light is formed with an annular slit by using an annular light transmission member (not shown) having the annular slit for passing the light with a predetermined width. Moreover, in the first to fourth embodiments, the optical fiber cable 19 is configured by bundling a plurality of optical fiber members that bundle a plurality of optical fibers (not shown), and the tip portion of the plurality of optical fiber members may be distributed in one and the same circular shape, thereby forming annular light. In this case, it is possible to obtain annular light with a higher light intensity without forced cooling of the small and lightweight light-irradiating heads 21, 21A to 21C.

Moreover, in order to uniformize the irradiation time integral value of the light energy in each area of the substrate to which the annular light OP is irradiated, the ascending speed of the light-irradiating heads 21, 21A to 21D is controlled in the first to fifth embodiments, and the speed of adjusting the angle of the laser-beam-irradiating means 45A to 45L by the angle adjustment device 51 is controlled in the sixth embodiment, so that the speed of extending the inner diameter of the annular light OP is slower in the central side than in the outer circumferential side. The present invention can also be applied to a conventional case where a liquid material is spread on the substrate and then ultraviolet light is irradiated thereto. It should be noted that, except for the sixth embodiment, in the first to fifth embodiments, the spinner may be lowered in accordance with a descending speed pattern that is reverse to the ascending speed pattern VP, thereby extending the distance between the substrate 1 and the light-irradiating heads 21, 21A to 21D, and extending the inner diameter and the outer diameter of the annular light OP on the substrate 1.

As described above, although the present invention is particularly useful in a case where a cover layer with a uniform and thin film thickness is formed on a disc substrate such as a next-generation disc, it is also useful in a case where a resin film with a uniform film thickness is formed of an adhesive between various substrates such as disc substrates or glass in various types of DVD, or also in a case where a resin film with a uniform film thickness is formed on various substrates. It should be noted that, in a case where substrates are adhered to each other, it is preferable that an adhesive is fed annularly or in spots to a first substrate, and a second substrate is superposed thereon. In this state, the substrates are rotated at a high speed to spread the adhesive between the substrates, thereby forming a resin film R. At each time when the resin film R reaches a predetermined film thickness, annular light is irradiated through the second substrate as described above, and the resin film R is sequentially cured, thereby determining at a stage where the film thickness becomes constant.

Seventh Embodiment

Figure 12:
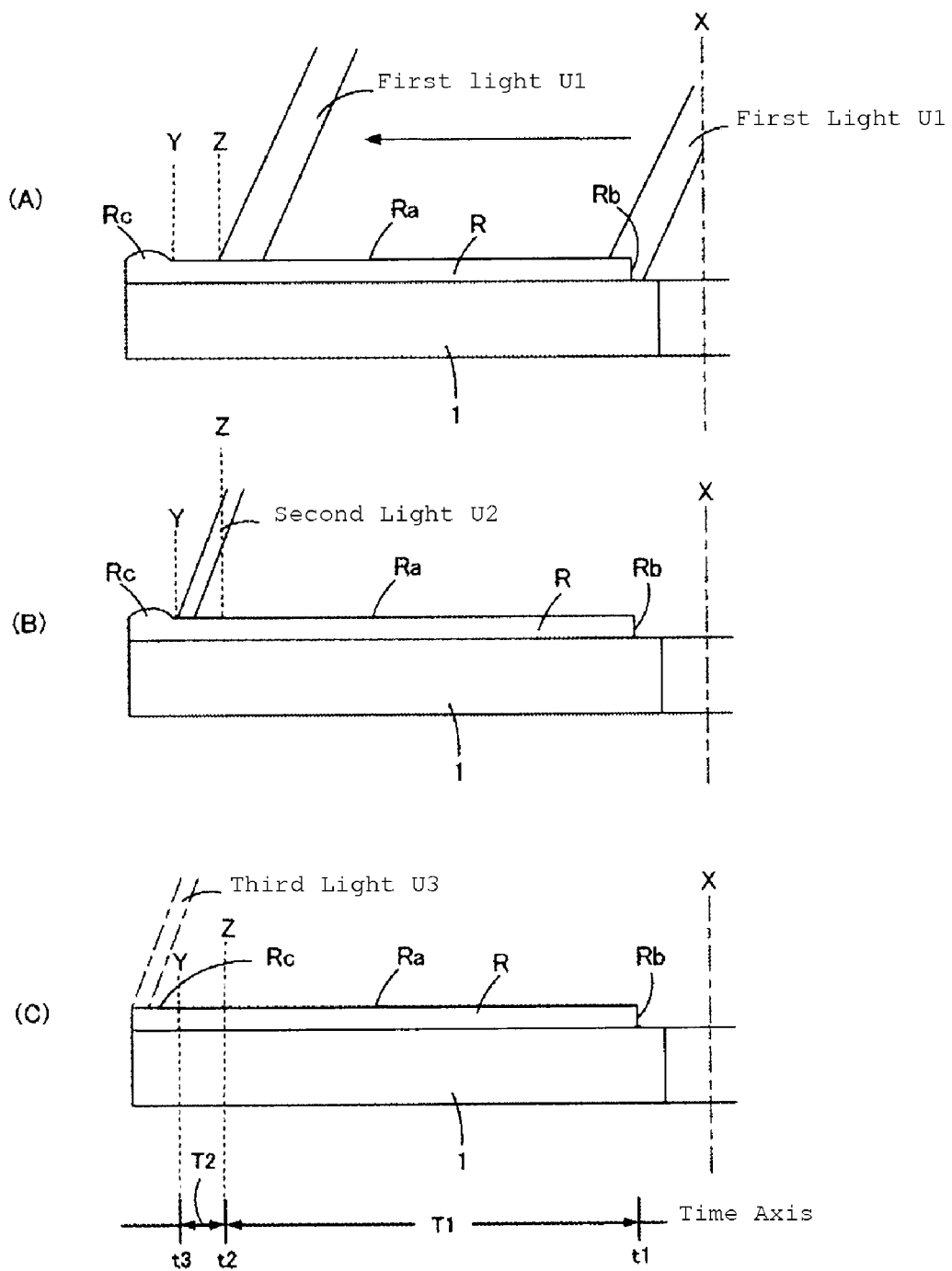
FIG. 12 is a diagram illustrating a method for forming a resin film according to a seventh embodiment of the present invention.
Figure 13:
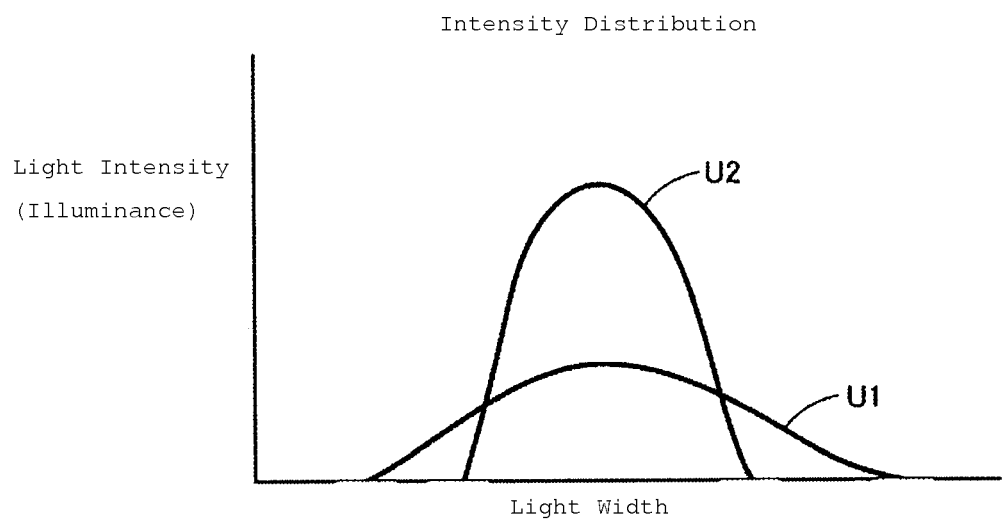
FIG. 13 is a diagram illustrating light used in the method for forming a resin film according to the seventh embodiment of the present invention.

Next, a method for forming a resin film according to a seventh embodiment of the present invention is described with reference to FIG. 12 and FIG. 13. In FIG. 12 and FIG. 13, the reference numerals used in FIG. 1 to FIG. 11 indicate members with the same names. In the present invention, light is irradiated up as far as a first position Y immediately before the outer periphery edge of the substrate 1 such as a Blu-ray Disc, and the irradiation of light is discontinued or ceased (hereinafter referred to as stopped) at the first position Y. Generally, it is preferable to irradiate light up as far as the set position, the light having a moderate intensity distribution (light with a wide irradiation range) so as to avoid causing irregularities on the boundary between the irradiated portion and the non-irradiated portion of the resin film. However, in a case where the irradiation of light is stopped at the first position Y immediately before the outer periphery edge of the substrate 1 in this way, it is difficult to irradiate the light so as not to exceed the first position Y, the light having an intensity distribution with a moderate gradient in which the cure shrinkage of the resin film R is small.

Moreover, when the light is irradiated so as not to exceed the first position Y of the resin film R as much as possible, the intermediate region between the irradiated portion and the non-irradiated portion immediately before the first position Y, i.e. the region in which the extent of the curing varies, becomes significantly large, resulting in a problem in that this intermediate region brings about deterioration of the evenness of the resin film R in a later step. Accordingly, in the seventh embodiment of the present invention, in the process of shifting the light to the first position Y that is the set position of the resin film R formed by the high-speed rotation, the light is irradiated up as far as a second position Z immediately before the first position Y, the light having an intensity distribution with a moderate gradient so as to avoid causing irregularities of the resin film R due to the difference of the cure shrinkage in the boundary between the irradiated portion and the non-irradiated portion. When the light arrives at the second position Z, the intensity distribution of the light begins to be controlled, and when the light arrives at the first position Y, the light is controlled so as to have at least a predetermined intensity distribution with a steep gradient.

According to the seventh embodiment, the boundary between the irradiated portion and the non-irradiated portion becomes clear at the first position Y of the resin film R, and the intermediate region between the cured portion and the non-cured portion of the resin film R becomes narrow, thereby making it possible to improve the evenness of the resin film R at the inner side of the first position Y without curing the resin film R at the outer circumferential side of the first position Y. In other words, the unclear intermediate region in the boundary between the irradiated portion and the non-irradiated portion in the vicinity of the first position Y enters a state where a part of the resin exhibits a curing tendency, i.e. a state where the curing is not sufficient. This insufficiently cured region in the resin film R becomes thinner because of movement thereof toward the outer circumferential side by centrifugal force at the time of the subsequent high-speed rotation process, whereby the evenness of the resin film R is deteriorated; therefore, a narrower unclear region in the boundary (the first position Y) between the irradiated portion and the non-irradiated portion improves the evenness of the resin film R. Alternatively, in a case where the unclear region extends into the outer circumferential side of the first position Y, the region does not become even by the subsequent high-speed rotation process, and the evenness deteriorates regardless.

In a case where an ultraviolet curable resin is used as the liquid material, ultraviolet light is used here. As shown in FIG. 13, for example, first light U1 has an intensity distribution shaped like a hill with a wide irradiation range (with a moderate gradient), in which the light energy (intensity) moderately increases to a peak and relatively moderately decreases from the peak, thereby moderately changing the intensity in the boundary between the irradiated portion and the non-irradiated portion. In other words, in a case where the first light U1 is annular light or circular spot light, a gradient of the intensity distribution in the radial light width on the circular substrate 1 moderately changes, so that irregularities do not arise in the boundary between the irradiated portion and the non-irradiated portion of the resin film R. Accordingly, the radial light width of the first light U1 on an irradiation surface Rb on the substrate 1 is larger than the light width of second light U2 to be described later. It should be noted that, in the seventh embodiment, since light is used in which the gradient of the intensity distribution in the radial light width on the circular substrate 1 moderately changes, so that irregularities do not arise in the boundary between the irradiated portion and the non-irradiated portion of the resin film R in the process of shifting the light, it possible to use not only the annular light, but also circular or elliptical spot light.

Here, the expression that the first light U1 has an intensity distribution shaped like a moderate hill refers to the rising gradient or the rising and falling gradient of the intensity distribution of the first light U1 being moderate as compared to the rising gradient or the rising and falling gradient of the intensity distribution shaped like a sharp hill of the second light U2 to be described later. Accordingly, the first light U1 may be the light itself from the light source (not shown), or may be light generated by enlarging the light, or may be light generated by narrowing the light, e.g., focused light, but is light that moderately changes so that irregularities do not arise in the boundary between the irradiated portion and the non-irradiated portion of the resin film R. Here, the rising gradient and the falling gradient of the intensity distribution of the light may be the same as each other or may be different from each other, but the rising gradient of the intensity distribution of the light affects the rate-of-change of the cure shrinkage of the resin film. In other words, the resin film is already cured when the falling gradient of the intensity distribution of the light passes the resin film, and the falling gradient of the intensity distribution of the light does not affect the cure shrinkage of the resin film, as a result of which the falling gradient of the intensity distribution of the light does not substantially constitute a problem. It should be noted that the rising gradient of the intensity distribution of the light refers to a gradient of the intensity distribution of the light that is irradiated to the substrate 1 in the outer circumferential side (to the direction of the light to advance), and the falling gradient refers to a gradient in the side of the central axis X of the substrate 1, respectively.

Next, a method for forming a resin film according to the seventh embodiment is specifically described. As shown in FIG. 12 (A), the first light U1 is irradiated to the inner periphery edge Rb of the resin film R during or after forming the resin film R on the substrate 1 by spreading the resin by the high-speed rotation. As shown in FIG. 12 (C), the irradiation time period of the first light U1 is from time t1 (hereinafter referred to as the light irradiation start time t1), when the inner periphery edge Rb of the resin film R reaches a predetermined film thickness, to time t2, and a first set time T1 progresses during this time period. During the first set time T1, the first light U1 shifts from the inner periphery edge Rb to the second position Z immediately before the first position Y. In other words, the first light U1 arrives at the second position Z at the time t2. In the process of shifting the first light U1, the intensity of light changes at any irradiated portion depending on the intensity distribution of the first light U1. Accordingly, it is preferable to uniformize the amount of the light irradiation energy per unit area of the surface irradiated by the first light, so that the light intensity becomes uniform.

As described above, in a case where the resin film R is formed by the spin coat method, since a thick portion Rc is formed in which the film thickness is increased in the outer circumferential portion, the first position Y is a set position immediately before the inner circumferential side of the thick portion Rc. Since the shifting speed of the first light U1 is a constant speed or a speed that is changed by a predetermined speed program, it is possible to obtain, exactly and in advance, an amount of time required for the first light U1 to shift from the inner periphery edge Rb of the resin film R to the second position Z immediately before the first position Y, and the amount of time required is the first set time T1 (from the time t1 to the time t2). The first set time T1 is affected by the length of the second set time T2 to be described later. Here, the gradient of the radial intensity distribution of the first light U1 moderately changes, and the boundary between the irradiated portion and the non-irradiated portion exhibits a relatively unclear state, a result of which conventional problems in the coating film such as deterioration of evenness, warping, or undesirable appearance do not occur.

As shown in FIG. 13, the gradient of the intensity distribution of the second light U2 is steeper than that of the first light U1. The second light U2 is set to have a gradient of an intensity distribution to the extent that the boundary between the irradiated portion and the non-irradiated portion in the first position Y becomes clear. In other words, the second light U2 is light by which the intensity distribution of the first light U1 is changed to the set intensity distribution within the second set time T2 (from the time t2 to the time t3), and is light by which the gradient of the intensity distribution becomes steeper in the second set time T2. Accordingly, if the rate-of-change of the intensity distribution of the light is sudden, the second set time T2 will be short, and it is possible to increase the first set time T1 correspondingly. On the other hand, if the rate-of-change of the intensity distribution is gradual, the second set time T2 will become long, and the first set time T1 will be decreased correspondingly. The second light U2 is irradiated up as far as the first position Y immediately before the thick portion Rc of the resin film R, and ceases thereafter, without substantially being irradiated to the thick portion Rc.

Since a surface area with little distance from the second position Z to the first position Y is irradiated by the second light U2 having gradient is steeper than that of the first light U1, it is possible to substantially equalize the amount of the light energy thereof with the amount of the light energy per unit area of the first light U1 irradiated up as far as the second position Z, and it is possible to substantially uniformize the light energy on the entire irradiated surface of the substrate 1. Moreover, since the boundary between the portion that is irradiated by the second light U2 and the portion that is not irradiated by the second light U2 is clear in the first position Y, the resin film R is cured up as far as the portion immediately before the thick portion Rc, and the thick portion Rc is left uncured. This makes it possible to selectively irradiate light with a desired intensity distribution, without providing a mask member for blocking the light irradiation as in the conventional cases, and without irradiating light to a region for which the light irradiation is not necessary. The uncured thick portion Rc of the resin film R is left as is so as to become even, or an additional spin process for planarizing by a centrifugal force is applied to the uncured thick portion Rc, and then light is irradiated to cure the thick portion Rc.

Eighth Embodiment

Figure 14:
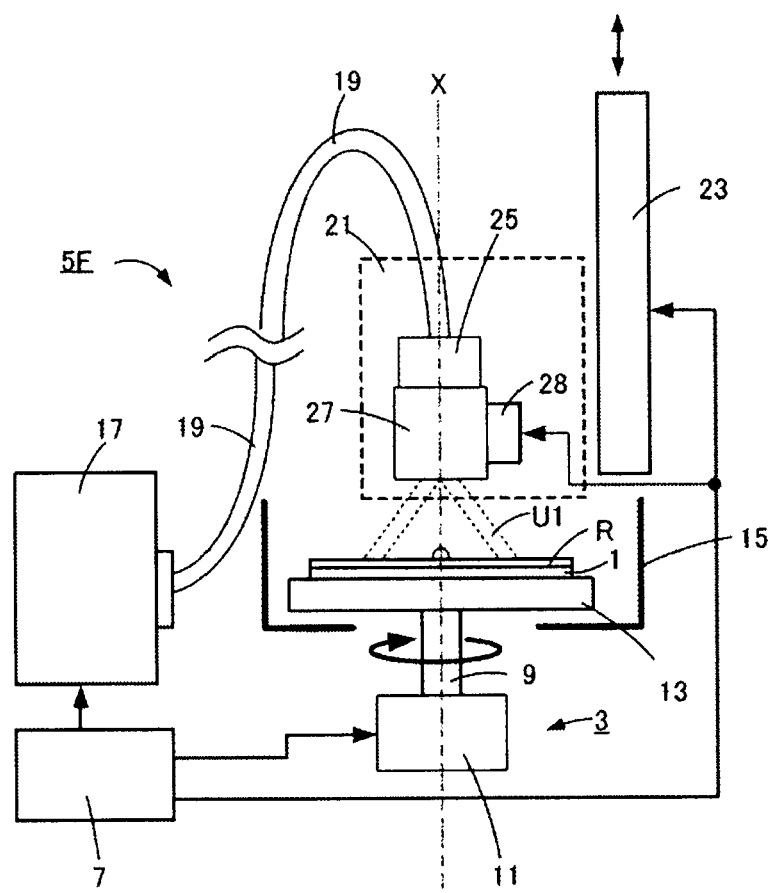
FIG. 14 is a diagram illustrating an example of a method for forming a resin film and an apparatus for realizing the method according to an eighth embodiment of the present invention.
Figure 15:
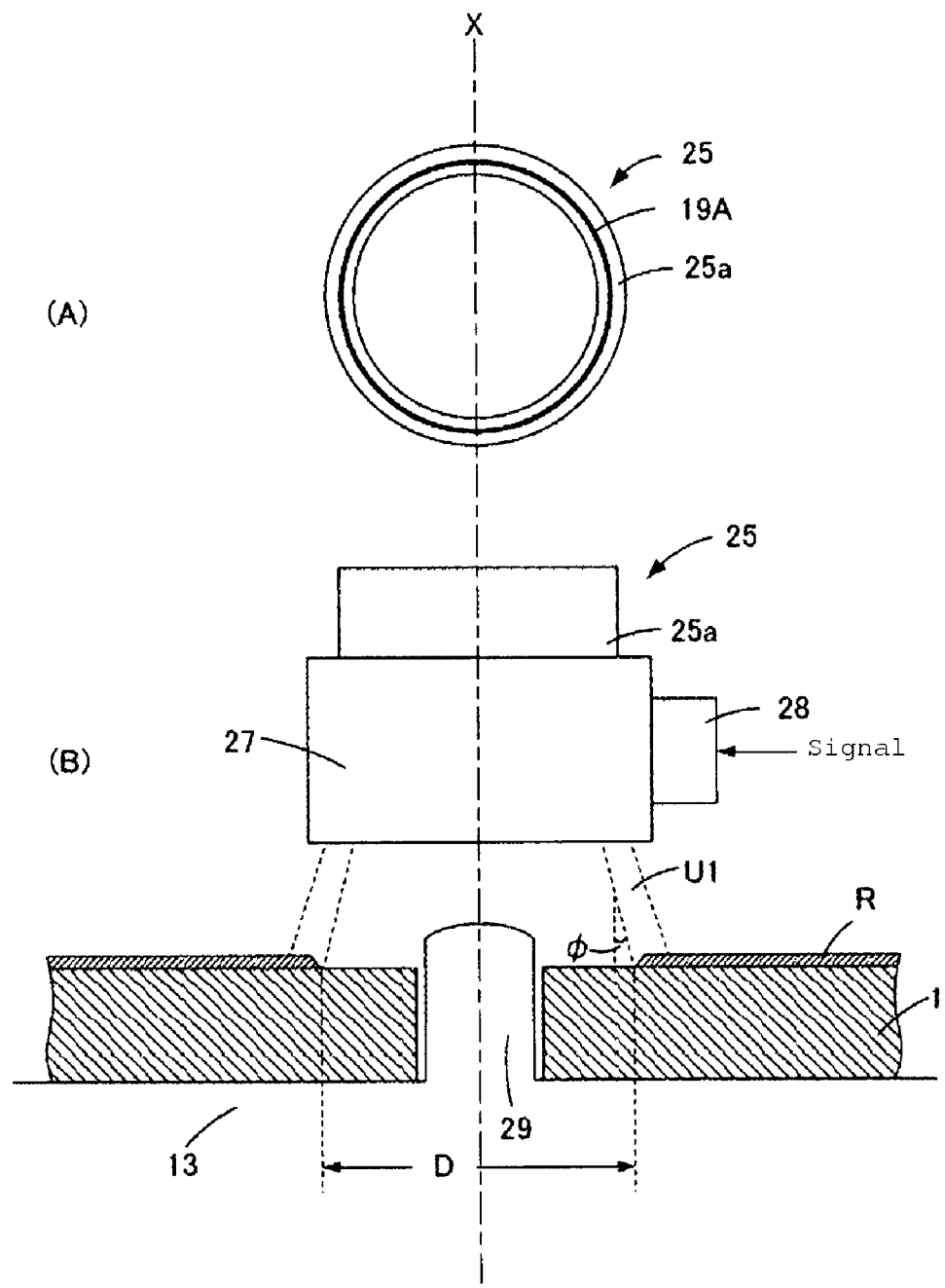
FIG. 15 is a diagram illustrating an example of an annular-light-forming portion used in the eighth embodiment.
Figure 16:
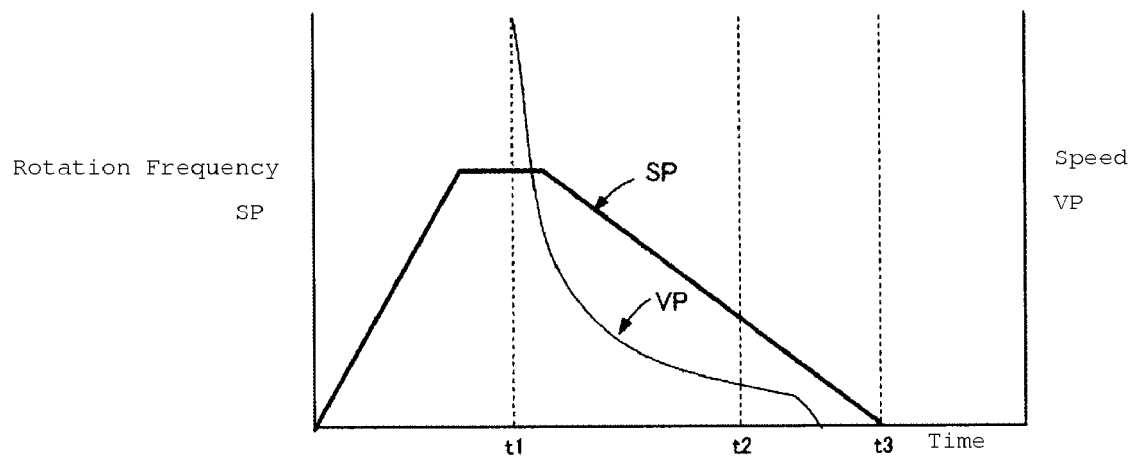
FIG. 16 is a diagram illustrating an example of a spin pattern of a substrate and an ascending speed of a light-irradiating head according to the eighth embodiment.

A method and an apparatus for forming a resin film according to an eighth embodiment of the present invention are described with reference to FIG. 14 to FIG. 16. FIG. 14 is a diagram illustrating an apparatus for forming a resin film according to the eighth embodiment of the present invention, and FIG. 15 is a diagram illustrating light irradiation. FIG. 16 is a diagram showing a spin pattern SP that is an example of a spin program of the substrate. In FIG. 14 and FIG. 15, the reference numerals used in FIG. 1 and FIG. 2 indicate members with the same names. In the eighth embodiment, an annular first light beam U1 having an intensity distribution of a moderate gradient, which does not cause irregularities in the resin film R in the boundary between the irradiated portion and the non-irradiated portion, sequentially increases an inner diameter and an outer diameter of the light beam U1 correspondingly to a speed of spreading the resin film, so that a time integral value of the light energy (a total amount of light) on the irradiated surface area becomes substantially uniform. A substantially uniform amount of light energy is irradiated to the entire surface of the substrate 1 to be irradiated by the light, thereby sequentially curing the resin film so as to determine a substantially constant thickness thereof from the inner circumferential side. The liquid material in the portion that has substantially reached a predetermined thickness is prevented from being moved to the radially outward direction by subsequent high-speed rotation, thereby aiming at uniformization of the film thickness of the liquid material and planarization of the resin film on the entire surface of the substrate without causing warping. It should be noted that, although the substrate 1 is a disc substrate having one or more signal recording layers, or a glass substrate or the like, the substrate 1 in this case is a disc substrate such as an optical disc with a high record density.

The eighth embodiment is different from the apparatus for forming a resin film shown in FIG. 1 in the first embodiment in that a focus-changing portion 28 is provided to a light-irradiating mechanism 5F. The focus-changing portion 28 controls the focus of the annular light by changing the distance between the annular-light-irradiating portion 25 and the lens member 27. In one example, the lens member 27 performs actions of suppressing the scattering of the annular ultraviolet light emitted from the annular tip face of the optical fiber 19 in the annular-light-irradiating portion 25, and irradiating the annular light to the substrate 1 while retaining the width of the annular light. It is preferable for the lens member 27 in the eighth embodiment to be a lens mechanism which combines a plurality of generally used lenses, and to have a lens structure which makes it possible to adjust the distance between lenses so that the aforementioned actions can be performed at the same time; however, it is possible to use various types of lens structures including a combination of lenses of various shapes, e.g., a zoom lens structure used in a general optical camera. In the present embodiment, since the substrate 1 is an optical disc substrate, it is preferable for the distance between the lens member 27 and the substrate 1 to be in a range of 10 mm to 500 mm, from the viewpoint of efficiency of the annular light and the like. Here, the annular-light-irradiating portion 25, the lens member 27 and the focus-changing portion 28 constitute an example of a light intensity distribution modification mechanism.

The annular light is tilted conically at a predetermined angle phi (e.g., 5 to 30 degrees) in relation to the rotation center X. When the light-irradiating head 21 is positioned at the set lower limit position, i.e. when the lens member 27 is positioned at the set lower limit position (for example, when the bottom face of the lens member 27 is positioned 10 mm above the substrate 1), the inner diameter of the first light U1, which is annular light, is determined so that the annular first light U1 is capable of irradiating the inner circumference of the resin film R extended on the substrate 1. For example, when the inner diameter of the resin film R is D as shown in FIG. 15 (B), the inner diameter of the first light U1 has to be smaller than the inner diameter D of the resin film R to some extent. Accordingly, the light-irradiating head 21 is shifted upward from the lower limit position by the head-lifting device 23, whereby the first light U1 that has irradiated the inner circumferential position of the resin film R is shifted toward the outer circumferential direction of the substrate 1.

The control mechanism 7 in the eighth embodiment stores, in memory (not shown), a plurality of spin patterns (shown by a spin pattern SP in FIG. 16 as an example), which make it possible to obtain a desired film thickness for various conditions such as a type and a viscosity of a liquid material for forming the resin film R. The control mechanism 7 is provided with such functions as: a rotation control function for controlling the rotation driving of the rotational drive unit 11; a light control function for controlling ON/OFF of the ultraviolet light source 17; an ascension control function for controlling the ascending speed of the light-irradiating head 21 in accordance with an ascending speed program (shown as a speed pattern VO in FIG. 16 as an example) for irradiating substantially uniform light energy to the entire surface of the substrate 1; and a focus adjustment function for changing the focus of the lens member 27 by sending a signal to the focus-changing portion 28 at the time t2 shown in FIG. 12 (C).

Next, operations of the apparatus for forming a resin film according to the eighth embodiment are described. Descriptions are omitted for operations that are similar to those in the first embodiment. At the light irradiation start time t1, when the inner circumference of the resin film R made of an ultraviolet curable resin reaches a predetermined film thickness by the rotation of the substrate receiving mount 13, the control mechanism 7 turns on the ultraviolet light source 17 of the light-irradiating mechanism 5F to output ultraviolet light. The ultraviolet light through the optical fiber cable 19 is converted into annular ultraviolet light by the annular-light-irradiating portion 25, and the lens member 27 of the light-irradiating head 21 in the set lower limit position irradiates the annular first light U1 to the inner periphery edge Rb of the resin film R (FIG. 12).

At this time, the lens member 27 is adjusted to provide a predetermined moderate focus by the focus-changing portion 28. The annular first light U1 from the lens member 27 is light having an intensity distribution of Gaussian distribution (normal distribution) in which the gradient of the light energy is moderate, as described in FIG. 13. At the same time of irradiating the first light U1, the control mechanism 7 controls the head-lifting device 23 with the speed pattern VP (a curve VP in FIG. 16) corresponding to the selected spin pattern SP, and elevates the light-irradiating head 21 in accordance with the speed pattern VP.

With this, the light-irradiating head 21 ascends along the rotation center axial line X in accordance with the speed pattern VP, i.e. moves away from the upper surface of the substrate 1, a result of which the inner diameter and the outer diameter of the first light U1 become larger, and the first light U1 is shifted from the inner circumferential side to the outer circumferential side. This shifting speed is determined in accordance with the time during which the resin film R is spread and reaches a predetermined thickness from the inner side to the outer side. In other words, the annular first light is shifted toward the outer circumferential side substantially at the same time of spreading the liquid material, and the resin film R is sequentially cured at each time of reaching a predetermined thickness, thereby sequentially determining the film thickness. Assuming that the first light U1 arrives at the second position Z immediately before the first position Y as described in FIG. 1 at the time t2 when the first set time T1 has progressed since the light irradiation start time t1, the control mechanism 7 transmits a signal to the focus-changing portion 28 at the same time (at the time t2) when the first set time T1 has progressed since the light irradiation start time t1, and the focus-changing portion 28 starts to change the focus of the lens member 27 to a predetermined focus by changing the distance between the lens member 27 and the annular-light-irradiating portion 25 and perform the like.

With the aforementioned series of actions, the first light U1 becomes the second light U2 by starting focusing at the time t2 corresponding to the second position Z immediately before the first position Y of the resin film R. The second light U2 becomes the annular second light U2 having at least a set intensity distribution with a steep gradient as shown by the curve U2 of FIG. 13 at the first position Y, which is a position corresponding to the time t3 when the second set time T2 has progressed since the time t2. In this state, as a matter of course, the light width of the second light U2 is narrower than that of the first light U1, and the peak value of the light energy thereof is higher than that of the first light U1. The speed of shifting the second light U2 is determined such that the total amount of light per unit area of the surface irradiated by the second light U2 is substantially equal to the total amount of light per unit area of the surface irradiated by the first light U1 at the predetermined position Z. The illuminance of the second light U2 is controlled depending on the cases. Accordingly, the second light U2 is light in which the focus is narrowed within the second set time T2. Therefore, if the speed of changing the focus of the focus-changing portion 28 is fast, the second set time T2 will be made short. Moreover, if the speed of changing the focus of the focus-changing portion 28 is slow, the second set time T2 will become long. Accordingly, if the second set time T2 is short, it is possible to increase the first set time T1 correspondingly, which is preferable. It should be noted that, in the process of narrowing the focus of the second light U2, the peak value may be controlled such that the light intensity of the light emitted by the ultraviolet light source 17 is controlled by power control to be described later, for example, such that the total amount of light per unit area is substantially constant.

The second light U2 gains the final intensity distribution at the first position Y, and the control mechanism 7 transmits an OFF signal to the ultraviolet light source 17 at the time t3 when the second light U2 of the final intensity distribution arrives at the first position Y, thereby terminating the second light U2. In the eighth embodiment, the first light U1 and the second light U2 are not irradiated to any other portions than the resin film R; therefore, the cover member 15 of the substrate rotation mechanism 3 and the like are mostly not irradiated, even in a case where the light irradiation is performed my means of the same substrate rotation mechanism 3. After curing the resin film R up as far as the inner side of the first position Y, if necessary, the uncured thick portion Rc is planarized by a spin process, and is cured by irradiating third light U3 thereto.

In the eighth embodiment, as the light-irradiating head 21 ascends, the inner diameter of the first light U1 becomes larger in the radial direction, and the irradiated area becomes larger with this as a matter of course, a result of which the energy of the first light U1 irradiated per unit area becomes smaller toward the outer circumferential side. Accordingly, in the eighth embodiment, a speed pattern VP is used in which the ascending speed of the light-irradiating head 21 is decreased as the area irradiated by the first light U1 is increased, such that the amount of irradiation energy per unit area of the ultraviolet light irradiated to the resin film R is substantially uniform. Moreover, a spin pattern may be used in combination in which the rotation speed of the substrate 1 is decreased as the area irradiated by the first light U1 is increased.

With this ascending speed pattern VP, the ascending speed of the light-irradiating head 21 is decreased as the first light U1 is shifted toward the outer circumferential side, a result of which the speed of extending the inner diameter and the outer diameter of the first light U1 is decreased, that is to say, the irradiation time of the first light U1 becomes longer. Accordingly, by selecting and combining the spin pattern SP and the speed pattern VP, it is possible to substantially uniformize the time integral value of the irradiation energy of the first light U1 on the entire irradiated surface of the substrate 1, while the speed of extending the inner diameter and the outer diameter of the annular light OP is made substantially equal to the speed of the portion of the resin film R reaching a predetermined film thickness to shift from the inner circumferential side to the outer circumferential side. Therefore, according to the eighth embodiment, it is not only possible to form the resin film R with a uniform film thickness on the substrate 1, but also to obtain an optical disc and the like on which a resin film of high quality is formed without causing warping, because the heat distribution of the substrate 1 is substantially uniform.

In another example of the eighth embodiment, the control mechanism 7 has the above-mentioned control function, and further has a control function for controlling power supplied to the ultraviolet light source 17 in accordance with a light control program consisting of the irradiation time and the irradiation intensity, as well as for controlling ON/OFF of the ultraviolet light source 17. By use of the light control program, the input power of the ultraviolet light source 17 is controlled so as to increase the increasing rate of the illuminance of the first light U1 in proportion to the increasing rate of the irradiated area of the first light U1 on the substrate 1, i.e. in proportion to the increasing rate of the radius of the first light U1. In this way as well, it is possible to substantially uniformize the time integral value of the irradiation energy of the first light U1 on the entire surface of the substrate 1, i.e. the amount of light irradiation energy per unit area of the entire surface, and to obtain a substrate with a high quality as in the case of the aforementioned eighth embodiment. The irradiation energy per unit area of the substrate 1 is decreased as the first light U1 is shifted toward the outer circumferential side of the substrate in accordance with the increase of the distance from the substrate 1. Accordingly, a spin pattern for a slow rotation speed may be combined with an ascending speed pattern for a slow ascending speed in order to compensate for the reduction in the irradiation energy.

Moreover, in a case where the light intensity of the first light U1 is increased, a combination may be performed with one or both the spin pattern and the ascending speed pattern as described above, as a matter of course. It should be noted that the liquid material may be fed to the substrate 1 in a state where the substrate 1 is placed on the substrate receiving mount 13, while rotating the substrate receiving mount 13 at a low speed. Although the resin film R on the substrate 1 has been described in the aforementioned seventh and eighth embodiments, a similar effect is achieved in a case where substrates are adhered to each other, by shifting the first light U1 toward the outer circumferential side in synchronization with the time for the resin film to reach a predetermined thickness in the process of spreading the liquid material between the substrates by centrifugal force of the high-speed rotation. Moreover, since the resin squeezed out of the periphery end face between the substrates (not shown) can remain uncured by changing the first light U1 to the second light U2 immediately before the outermost periphery, it is possible to easily remove the squeezed-out resin. In addition, when performing separation of another to-be-separated substrate (not shown) in a state where the resin squeezed out of the periphery end face between the substrates is not cured, since powder dust is not generated, it becomes possible to obtain a multi-layered optical disc of high quality.

It should be noted that the spread resin film can be cured also in a case where the light is irradiated after spreading the liquid material on the entire surface of the substrate.

Figure 17:
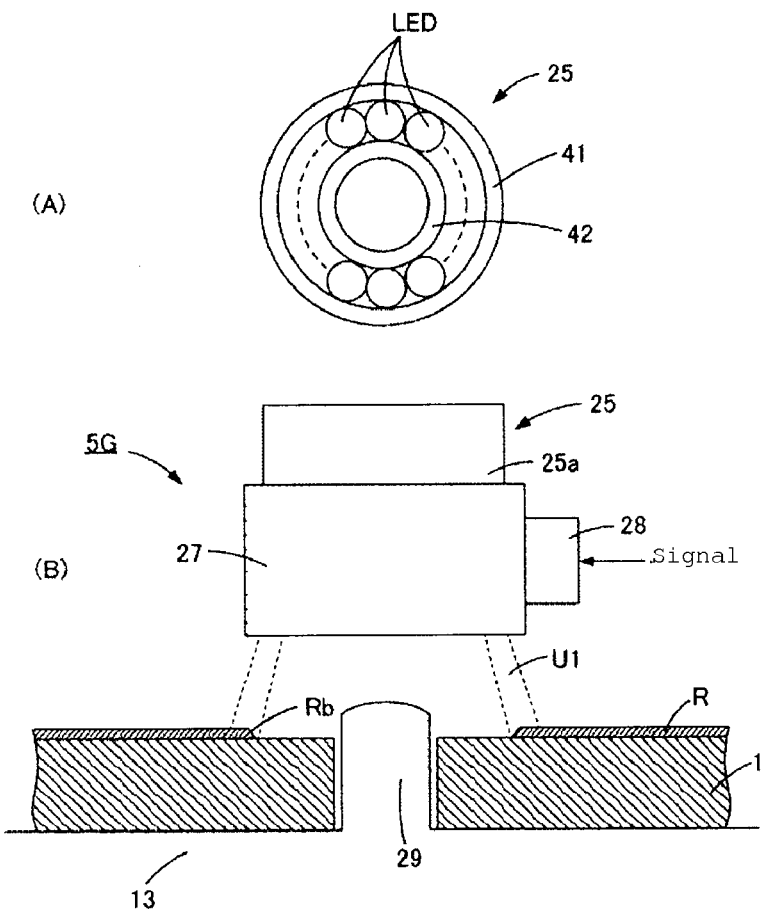
FIG. 17 is a diagram illustrating another example of the annular-light-bean-forming portion used in the eighth embodiment.

Another example of the light-irradiating mechanism 5F in the eighth embodiment is described with reference to FIG. 17. In FIG. 17, the reference numerals used in FIG. 14 and FIG. 15 indicate members with the same names. In the example of the light-irradiating mechanism 5G shown in FIG. 17, a light emitting diode LED for emitting ultraviolet light is used in place of the ultraviolet light source 17 of the first embodiment. A plurality of light emitting diodes (LED's) are arranged to be in close contact or with a slight gap with each other between an annular outer wall portion 41 and an annular inner wall portion 42 of a casing, all of which constitute the annular-light-irradiating portion 25. In this example, the annular-light-irradiating portion 25 itself generates annular ultraviolet light in the vicinity of the lens member 27. The annular light by the annular-light-irradiating portion 25 is converted into the first light U1 and also the second light U2 having illuminance with a normal distribution as shown in FIG. 13 by the lens member 27 and the focus-changing portion 28, which are similar to those described in the eighth embodiment.

Figure 18:
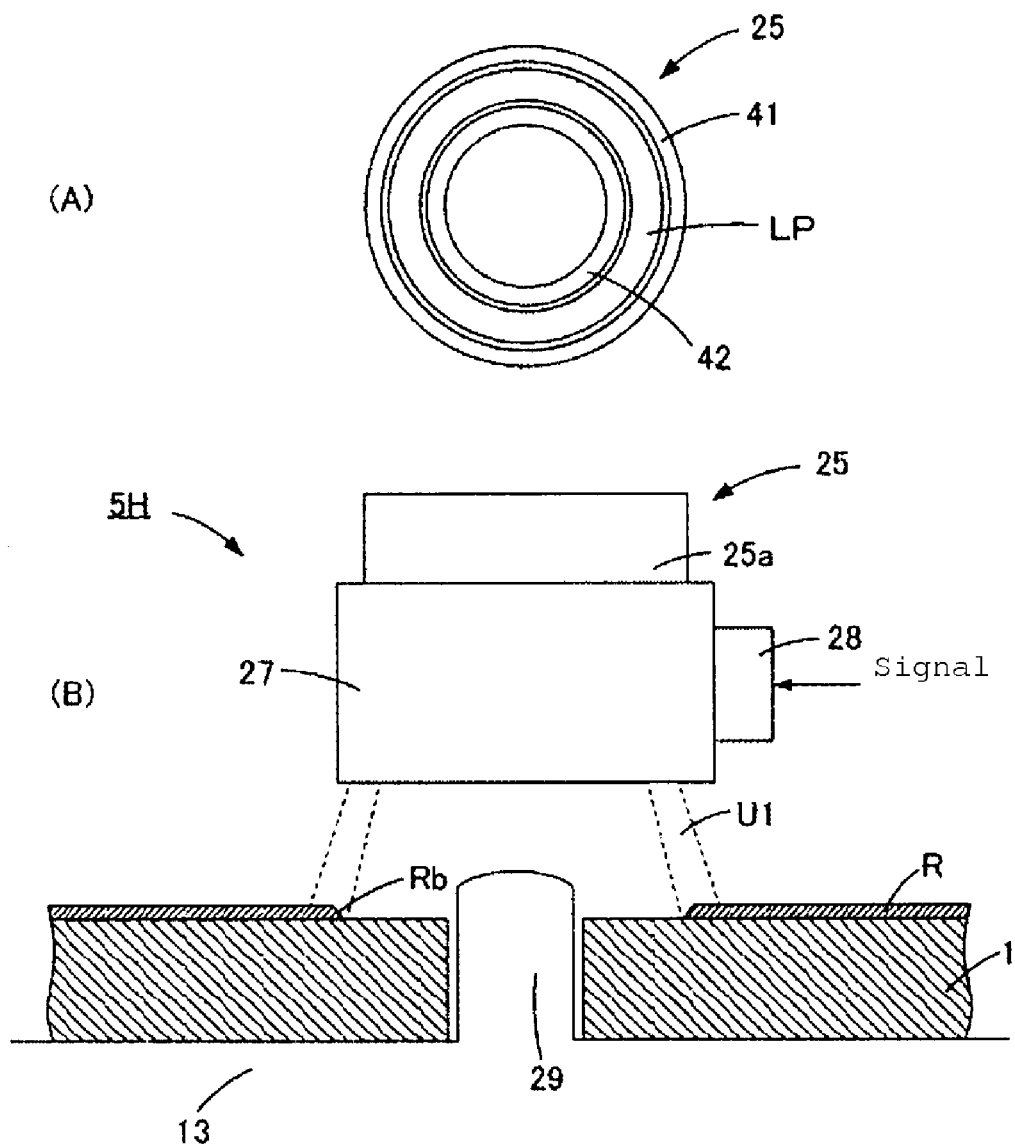
FIG. 18 is a diagram illustrating another example of the annular-light-forming portion used in the eighth embodiment.

Furthermore, in another example of the annular-light-irradiating portion 25a of a light-irradiating mechanism 5H shown in FIG. 18, an annular-ultraviolet-irradiating lamp LP with an appropriate diameter is used. In FIG. 18, the reference numerals used in FIG. 14 to FIG. 17 indicate members with the same names. The annular-ultraviolet-light-irradiating lamp LP is arranged between the annular outer wall portion 41 and the annular inner wall portion 42 of the casing, such that most of the ultraviolet light emitted by the ultraviolet-light-irradiating lamp LP travel toward the lens member 27. In this example as well, the annular-light-irradiating portion 25 itself generates the annular light in the vicinity of the lens member 27. In these examples, the peak value of the light energy of the second light U2 is greater than that of the first light U1, unless a light intensity control is performed by a special power control.

Therefore, these examples are different from the eighth embodiment in that, the light source is the plurality of light emitting diodes LED or the annular-ultraviolet-light-irradiating lamp LP, thereby making it possible not only to omit the optical fiber cable bundling a lot of optical fibers, but also to connect durable metal wiring, which is superior in flexibility, to the annular-light-irradiating portion 25. Accordingly, it is possible to easily move the light-irradiating head 21 having the annular-light-irradiating portion 25 in the vertical direction, and to improve the reliability of the apparatus. It should be noted that the first light U1 and the second light U2 may be irradiated in a light irradiation position that is different from the substrate rotation mechanism 3, after forming the resin film R. It should be noted that various other configurations can be contemplated for the annular-light-irradiating portion 25, and the present invention is not limited to the configuration of the annular-light-irradiating portion 25.

Ninth Embodiment

Figure 19:
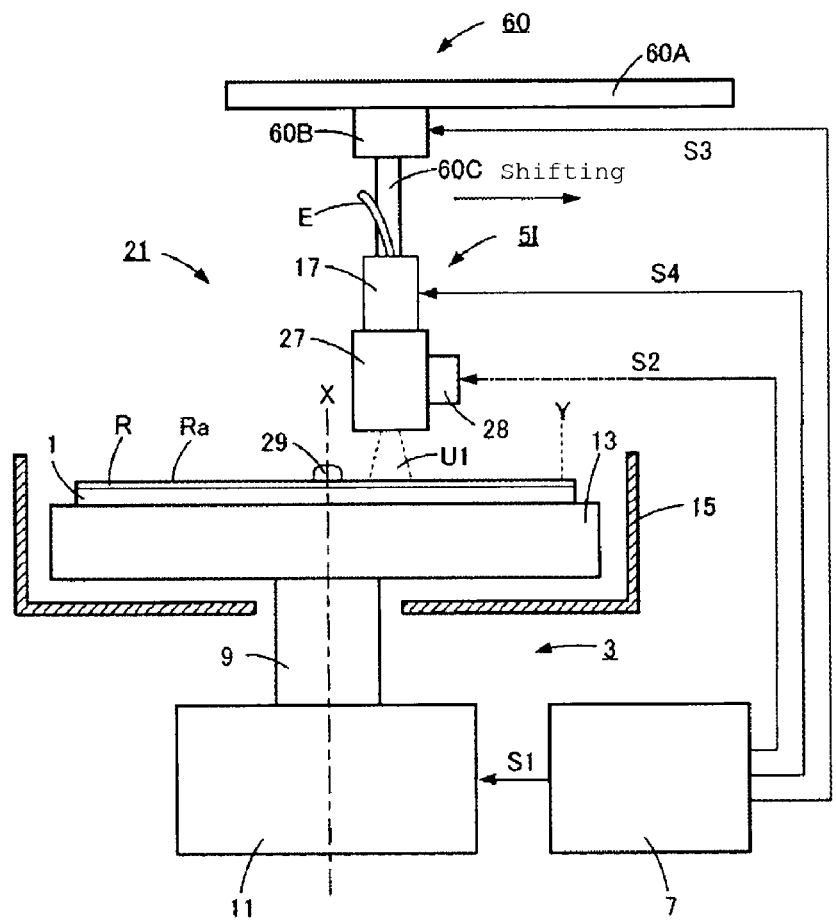
FIG. 19 is a diagram illustrating an example of a method for forming a resin film and an apparatus for realizing the method according to a ninth embodiment of the present invention.
Figure 20:
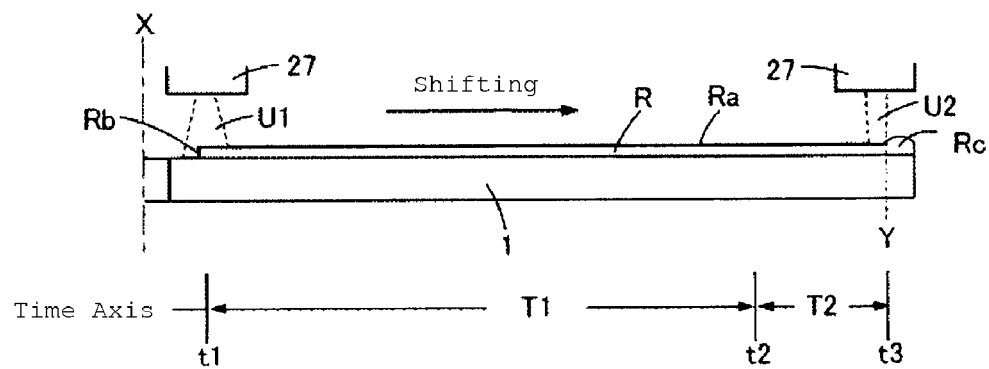
FIG. 20 is a diagram illustrating the method for forming a resin film according to the ninth embodiment of the present invention.

A ninth embodiment of the present invention is described with reference to FIG. 19 and FIG. 20. FIG. 19 is a diagram illustrating an apparatus for forming a resin film according to the ninth embodiment, and FIG. 20 is a diagram illustrating a method for forming a resin film according to the ninth embodiment. In FIG. 19 and FIG. 20, the reference numerals used in FIG. 14 to FIG. 18 indicate members with the same names. The ninth embodiment is different from the eighth embodiment in that, in place of the annular light, spot light is irradiated to the resin film. The spot light is light with a circular shape shifting from the inner circumferential side to the outer circumferential side parallel with the resin film that is an irradiated surface, or light with an elliptical (oval) shape elongated in the shifting direction. In the ninth embodiment, the substrate 1 always rotates at a selected spin pattern or at a constant speed during the process of irradiating the spot light.

In FIG. 19, this light-irradiating mechanism 5I consists of the ultraviolet light source 17, the lens member 27, the focus-changing portion 28, a parallel displacement mechanism 60 and the like. The ultraviolet light source 17 consists of, although not illustrated, a light-emitting member for emitting ultraviolet light, a member for adjusting the illuminance thereof, a switch mechanism, and the like, and the signals from the control mechanism 7 perform illuminance adjustment and turning ON/OFF of the light emission. The light-emitting member of the ultraviolet light source 17 consists of a laser diode, a small laser tube, a light emitting diode, an ultraviolet lamp or the like for emitting light with a desired wavelength. In a case where the light-emitting member consists of a laser diode or a light emitting diode, the plurality of laser diodes or light emitting diodes may be arranged in close contact with each other in a circular or elliptical manner, thereby obtaining a spot light with a circular or elliptical shape. The parallel displacement mechanism 60 consists of a guide member 60A such as a rail, a displacement member 60B for displacing the guide member 60A to right and left in FIG. 19, and a connecting member 60C for connecting the displacement member 60B to the light-irradiating head 21 consisting of the light-irradiating mechanism 5I and the like. It should be noted that E is an electric supply line for supplying electric power from an electric power supply (not shown) to the ultraviolet light source 17, and is superior in flexibility. Here, the lens member 27, the focus-changing portion 28 and the parallel displacement mechanism 60 constitute an example of the light intensity distribution modification mechanism.

Next, operations are described. The rotational drive unit 11 rotates the substrate 1 with a spin pattern selected by a signal S1 from the control mechanism 7. As described above, at the time t1 when the inner circumference of the resin film R made of an ultraviolet curable resin reaches a predetermined film thickness by way of the centrifugal force of the high-speed rotation of the substrate, the control mechanism 7 transmits an ON signal S4 to the ultraviolet light source 17, and the ultraviolet light source 17 is turned on to emit ultraviolet light. Since the lens member 27 is adjusted to a predetermined focus by the focus-changing portion 28 in advance, spot first light U1 is irradiated to the inner circumferential portion of the resin film R. The focus of the first light U1 is constant, and as described above, the first light U1 is a light having focus which is moderate to an extent that the evenness and appearance of the coating film is not deteriorated in the process of shifting the light toward the outer circumferential side, and is a light with an intensity distribution of a normal distribution having a moderate gradient on the light irradiated surface Rb of the resin film R as described in FIG. 13.

The control mechanism 7 transmits a signal S3 to the displacement member 60B, and the displacement member 60B is moved toward the outer circumferential direction parallel with the substrate 1 with a preselected speed pattern. Along with this, the spot first light U1 is shifted toward the outer circumferential side on the surface of the resin film R. The speed pattern thereof is determined mainly by taking into consideration the time for the ultraviolet curable resin to be spread and form the resin film R of a predetermined thickness from the inner side to the outer side, and the peripheral speed that is changed as the first light U1 is shifted toward the outer circumferential direction. With this, the spot first light U1 is shifted toward the outer circumferential side corresponding to the spreading of the liquid material, and the resin film R is sequentially cured at each time of reaching a predetermined thickness, thereby sequentially determining the film thickness. As shown in FIG. 20, the first light U1 is irradiated from the light irradiation start time t1 to the time t2, when the first set time T1 has progressed. At the same time as the time t2, the control mechanism 7 transmits a signal S2 to the focus-changing portion 28, and the focus-changing portion 28 performs actions for changing the distance between the lens member 27 and the resin film R to a set value. Since this changing operation is mainly a mechanical operation, time that is longer than the minimum time for changing the focus, i.e. the second set time T2, is required.

The spot first light U1 becomes the second light U2 at the time when the time t2 has progressed. The focus-changing portion 28 narrows the focus of the first light U1 during the second set time T2 from the start to the end of changing the focus of the lens member 27, thereby forming the second light U2. The second light U2 has an intensity distribution of a normal distribution having a steep gradient as shown in FIG. 13. Accordingly, the peak value of the light energy of the second light U2 is greater than that of the first light U1, unless light intensity control is performed by special power control. The second light U2 arrives at the first position Y of the resin film R at the time t3 when the second set time T2 has substantially progressed since the time t2, and the focus of the second light U2 is narrowed to at least the set value at the first position Y. During the period in which the first light U1 and the second light U2 are being irradiated to the resin film R, the substrate 1 is rotating, for example, with the spin pattern SP shown in FIG. 16, and the first light U1 is light that exhibits a condition where the boundary between the irradiated portion and the non-irradiated portion is relatively unclear as described above. Accordingly, since the cure shrinkage at the time when the resin film R is cured by the first light U1 is small, it possible to suppress the deterioration of the evenness of the coating film as in the conventional cases, without causing a problem in appearance.

Next, correction of chromatic aberration is described. Ultraviolet light is used as the light in the aforementioned embodiments, and most of the ultraviolet light from the ultraviolet light source (not shown) is light having a wavelength of, for example, 200 to 400 nm. Generally, due to the refractive index of the lens differing for the wavelengths, when the light is incident on the same surface area of the lens, light with a different wavelength is refracted with a different refractive index, and the light from the lens is irradiated to the light irradiated surface with a slight deviation. Even in a case where the intensity distribution of the light is controlled to have a steep gradient as described above, the influence of this chromatic aberration results in an unclear boundary between the irradiated portion and the non-irradiated portion, whereby the width of the boundary is broadened, which tends to broaden the width of the region in which the resin film is insufficiently cured.

In order to reduce the influence of such chromatic aberration, and to clarify a boundary between the irradiated portion and the non-irradiated portion by the wavelength of the light, a cut-off filter (not shown), which does not pass light with a wavelength that is equal to or less than a predetermined wavelength, is provided between the lens member 27 and the substrate 1. As an example, by using a cut-off filter for removing ultraviolet light with a wavelength that is equal to or less than 300 nm, most of the light irradiated to the resin film R of the substrate 1 will be ultraviolet light with a wavelength of 300 to 400 nm, and due to the deviation in light due to the difference of the wavelength being reduced, the boundary between the irradiated portion and the non-irradiated portion in the first position Y of the resin film R is clarified, as a matter of course. It should be noted that it is preferable for this cut-off filter not to correct chromatic aberration of the ultraviolet light irradiated up as far as the predetermined position Z.

Tenth Embodiment

Figure 21:
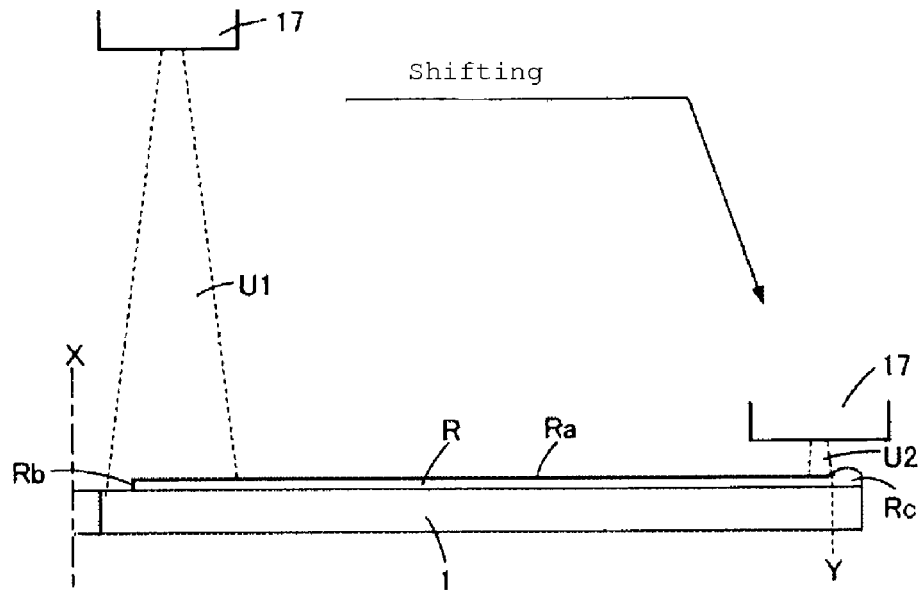
FIG. 21 is a diagram illustrating a method for forming a resin film according to a tenth embodiment of the present invention.

A tenth embodiment of the present invention is described with reference to FIG. 19 and FIG. 21. In FIG. 21, the reference numerals used in FIG. 19 and FIG. 20 indicate members with the same names. Although spot ultraviolet light is irradiated to the resin film R in the present embodiment as well, the present embodiment is characterized in that the ultraviolet light source 17 for generating ultraviolet light is lowered during the process to reduce the extent of the spot (ultraviolet) light, whereby the gradient of the intensity distribution of a normal distribution is made steep, without changing the focus of the (ultraviolet) light by the lens mechanism during the process. Since the configuration of the apparatus is similar to that of the apparatus shown in FIG. 19 in many aspects, descriptions are made with reference to FIG. 19. In this apparatus, it is convenient for at least part of the connecting member 60C of the displacement mechanism 60 shown in FIG. 19 to be configured with an extensible member (not shown) made of an extensible cylinder member and the like. It should be noted that, since a change of focus in which the focus of the first light U1 is changed to form the second light U2 is not required in the tenth embodiment, it possible to omit the lens member.

In the apparatus for forming a resin film implementing this method, a multi-directional displacement device (not shown) corresponding to the parallel displacement mechanism 60 is positioned above and away from the resin film R as compared to the case of the ninth embodiment. Although operations of the multi-directional displacement device are described later, the multi-directional displacement device constitutes an example of the light intensity distribution modification mechanism, and has a publicly known mechanism for displacing the ultraviolet light source 17 in a horizontal direction and a downward direction. The ultraviolet light source 17 is positioned above and away from the resin film R as compared to the case of the ninth embodiment, and the ultraviolet light irradiated from the ultraviolet light source 17 is extended to become the first light U1 having the intensity distribution of a normal distribution with a moderate gradient on the light irradiated surface Rb of the resin film R. The intensity distribution of the first light U1 is substantially constant and, as described above, the first light U1 is light with an intensity distribution that is moderate to an extent that the evenness and appearance of the coating film is not deteriorated in the process of shifting the light toward the outer circumferential side. In other words, the first light U1 is light with a wide irradiation range in which the boundary between the irradiated portion and the non-irradiated portion is relatively unclear, and the cure shrinkage of the resin film R is small, thereby giving almost no adverse effect to the evenness of the resin film R by shifting the light from the inner side to the outer side.

The spot first light U1 is shifted toward the outer circumferential side correspondingly to the spreading of the liquid material, and the resin film R is sequentially cured at each time of reaching a predetermined thickness of the resin film R that is rotating at a selected spin pattern, thereby sequentially determining the film thickness. The spot first light U1 is started to be changed into the second light U2 at the time t2 corresponding to the second position Z immediately before the set position Y corresponding to the first position of the resin film R. At the time t2, the control mechanism 7 transmits a signal to the extensible member (not shown) such as a cylinder member of the multi-directional displacement device (not shown), and the extensible member extends to lower the ultraviolet light source 17 in the downward direction. In other words, the ultraviolet light source 17 descends to the set lower limit position while moving in the horizontal direction, from the time t2 to the time t3, when the second set time T2 has progressed, and the second light U2 arrives at the first position Y of the resin film R at this time. The spot second light U2 at the first position Y is extended to a smaller extent, and the distance between the ultraviolet light source 17 and the resin film R is shorter, than in the case of the spot first light U1 as a matter of course. As a result, the attenuation is small, the peak value of the light illuminance is increased, the irradiation range on the light irradiated surface Rb is narrow, and the gradient of the intensity distribution that is a normal distribution is steep, thereby clarifying the boundary between the portion that is irradiated by ultraviolet light and the portion that is not irradiated.

Accordingly, the first position Y of the resin film R is cured by such second light U2, thereby making it possible to minimize the width of the intermediate region between the cured portion and the uncured portion, and serving to planarize the portion Rc that is thickened in the outer circumferential portion. It should be noted that, in the third embodiment, a minimum time is required for the ultraviolet light source 17 to descend from the initial height to the set lower limit position, and the gradient of the intensity distribution of the second light U2 becomes steeper as the time progresses. Although the time is adjustable, a shorter time is preferable since the irradiation time of the first light U1 can be increased. It should be noted that, since a change of focus in which the focus of the first light U1 is changed to form the second light U2 is not required in the tenth embodiment, it possible to omit the lens member. For example, in a structure in which the ultraviolet light source for generating ultraviolet light irradiates ultraviolet light from a cylindrical body tube with an appropriate diameter, it is possible to omit the lens member 27, and the economical efficiency is superior. Moreover, it is possible to reduce the size and weight of the apparatus.

Eleventh Embodiment

Figure 22:
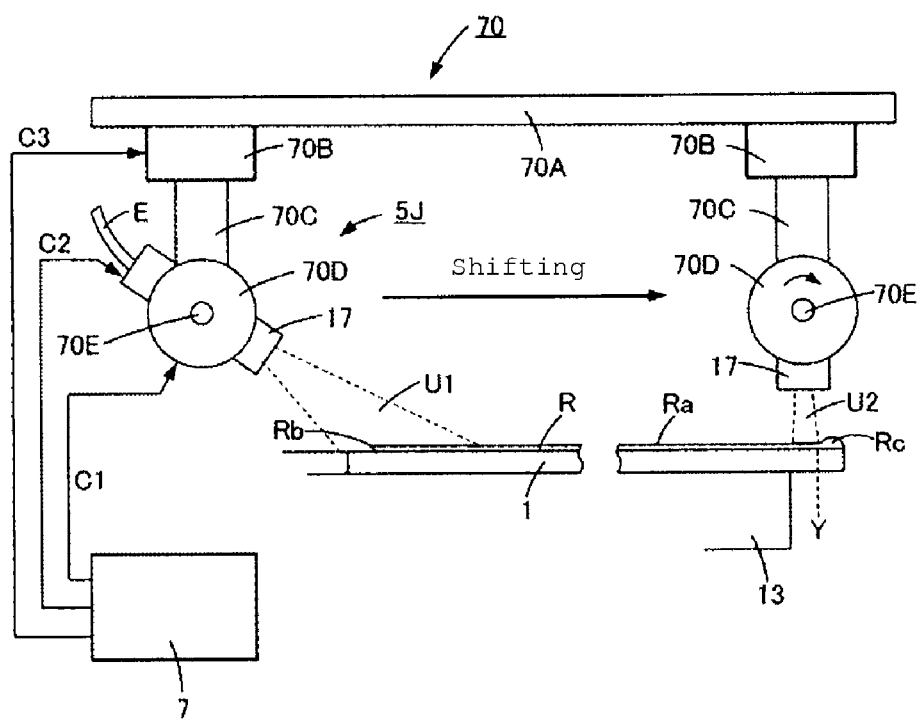
FIG. 22 is a diagram illustrating an example of a method for forming a resin film and an apparatus for realizing the method according to an eleventh embodiment of the present invention.

A method for irradiating spot light according to an eleventh embodiment of the present invention is described with reference to FIG. 22. In FIG. 22, the reference numerals used in FIG. 14 to FIG. 21 indicate members with the same names. The eleventh embodiment is essentially similar to the ninth and tenth embodiments, and due to the method for forming the first and second light being different, these portions are described. As shown in FIG. 22, a first characteristic is that the ultraviolet light source 17 for generating ultraviolet light is tilted at a certain angle, starting from the rotation center axis line X to the outer circumferential direction of the disc-shaped substrate 1, or starting from the outer circumferential direction to the rotation center axis line X, thereby tilting the irradiation angle of the ultraviolet light in relation to the irradiation surface of the resin film R at a predetermined angle, and forming the spot first light U1 of which the surface area is extended to be larger than the light-emitting face of the ultraviolet light source 17, on the irradiation surface of the resin film R, and a second characteristic is that the ultraviolet light source 17 is set to be substantially perpendicular to the irradiation surface of the resin film R, thereby obtaining the spot second light U2 of which the illuminance is greater than that of the first light U1.

This light-irradiating mechanism 5J is provided with a displacement and angle modification mechanism 70 in addition to the ultraviolet light source 17. The displacement and angle modification mechanism 70 constitutes an example of a light intensity distribution modification mechanism, and consists of a guide member 70A such as a rail, a displacement member 70B moving right and left in FIG. 22 along the guide member 70A, a connecting member 70C connecting one end thereof to the displacement member 70B, and an angle modification member 70D connected to another end of the connecting member 70C. The angle modification member 70D has a function of rotating the ultraviolet light source 17 at a certain angle with a fulcrum shaft 70E as a center thereof. The substrate rotation mechanism is the same as the substrate rotation mechanism 3 in the aforementioned embodiments. The angle modification member 70D receives a command signal C1 from the control mechanism 7 in advance, and tilts the ultraviolet light source 17 at a predetermined angle. Although the tilt angle $\theta$ is arbitrary, the angle selected, for example, is in a range of 20 to 60 degrees.

As described above, at the light irradiation start time t1, when the inner circumference of the resin film R on the substrate 1 reaches a desired thickness by the high-speed rotation of the substrate rotation mechanism 3, the control mechanism 7 transmits a command signal C2 to the ultraviolet light source 17 to turn it on in order to generate ultraviolet light that becomes the first light U1. Since the ultraviolet light source 17 is tilted at a predetermined angle in relation to the light irradiated surface, the first light U1 is irradiated to the light irradiated surface in a tilted manner. Accordingly, the intensity distribution is shaped like a moderate hill that is similar to the distribution shown by the curve U1 in FIG. 13, and is particularly shaped like a hill in which the falling gradient (in the rotation center side) is moderate as compared to the rising gradient (in the outer circumferential side), with the peak value of the intensity distribution favoring one side. The control mechanism 7 transmits a command signal C3 to the displacement member 70B substantially at the same time as, or slightly later than, the command signal C2. The displacement member 70B moves toward the outer circumferential direction with a predetermined speed pattern as in the case of the displacement member 60B described in the ninth embodiment. Along with this, the first light U1 is shifted toward the outer circumferential direction at the predetermined speed pattern.

At the time t2 corresponding to the second position immediately before the first position Y that is the set position of the substrate 1, the control mechanism 7 transmits the command signal C1 to the angle modification member 70D. Upon receiving the command signal C1, the angle modification member 70D rotates clockwise at the set angle with the fulcrum shaft 70E as the center thereof, and orients the ultraviolet light source 17 in a direction substantially perpendicular to the light irradiated surface, i.e. the resin film R. Accordingly, the first light U1, having an intensity distribution that is substantially constant from the time t1 to the time t2, decreases in irradiation area from the time t2, and becomes the second light U2. When the second light U2 substantially arrives at the first position Y (at the time t3), at least the ultraviolet light source 17 is directed in a direction substantially perpendicular to the resin film R.

Accordingly, the second light U2 has the intensity distribution of a normal distribution having a steep gradient at the first position Y of the resin film R, in which the rising gradient of the light clarifies the boundary between the portion irradiated by the ultraviolet light and the non-irradiation portion, whereby the resin film R is cured up as far as the portion immediately before the thick portion Rc of the outer circumferential portion, leaving the thick portion Rc uncured. In other words, since the final rising gradient of the intensity distribution of the second light U2 at the first position Y is steep, it possible to minimize the intermediate region between the cured portion and the uncured portion, and serves to planarize the portion Rc that is thickened in the outer circumferential portion. It should be noted that, in the eleventh embodiment, a minimum time is required for the ultraviolet light source 17 to change its direction from the initial tilted angle to the substantially perpendicular direction, and the intensity distribution of the second light U2 becomes steeper as the time progresses. Although the time is adjustable, a shorter time is preferable since the irradiation time of the first light U1 can be increased. In this case, the peak value of the intensity distribution of the second light U2 is greater than that of the first light U1. Moreover, the tilt angle of the ultraviolet light source 17 may be directed opposite to the drawing, and in this case, the gradient is shaped like a hill in which the rising gradient (in the outer circumferential side) is moderate as compared to the falling side (in the rotation center side).

In the eleventh embodiment as well, it is preferable that the spot first light U1 is shifted toward the outer circumferential side correspondingly to the spreading of the liquid material, and the resin film R is sequentially cured at each time of reaching a predetermined thickness of the resin film R that is rotating at a selected spin pattern, thereby sequentially determining the film thickness. However, after forming the resin film R with a substantially predetermined film thickness, the substrate 1 may be transferred to another substrate rotation device (not shown), and the first light U1 and the second light U2 may be irradiated thereto while rotating the substrate 1.

In the ninth to eleventh embodiments described above, since the spot light is of circular or oval (elliptical) shape, it is also possible to cope with a case in which the substrate is a glass plate or the like, and the resin film R is desired to be formed on the entire surface including the rotation center point of the upper surface thereof. As in the eighth embodiment, in the case of annular light as well, by bringing the lens member 27 close to the vicinity of the resin film R, it is possible to cope with a case in which the resin film R is desired to be formed on the entire surface including the rotation center thereof. It is possible to cure the entire surface including the central surface area of the resin film R of the substrate 1 by the irradiation energy of a substantially uniform time integral value, and to obtain a high-quality substrate provided with a resin film with a uniform film thickness that is superior in evenness. Moreover, although the first light U1 and the second light U2 are generated from one and the same light source in the ninth to eleventh embodiments, the first light U1 and the second light U2 may be respectively generated from separate light sources.

In this case, for example, the second light source for generating the second light U2 may be provided at the second position immediately before the first position Y of the substrate 1, and the second light source may be turned on when the first light U1 arrives at the portion immediately before the first position Y to irradiate the second light U2 at the first position Y of the substrate 1. Moreover, the annular first light U1 described in the eighth embodiment may be combined with the spot second light U2 described in the ninth to eleventh embodiments. It should be noted that the intensity of the light may be increased as the spot light is shifted toward the outer circumferential side as in the case of the first embodiment.

As described above, the present invention is particularly useful in a case where a cover layer with a uniform and thin film thickness is formed on an optical disc substrate of an optical disc with a high recording density. In addition, the present invention is also useful in a case where a resin film with a uniform film thickness is formed of an adhesive between various substrates such as an optical disc substrate or glass in various types of optical discs, or a case where a resin film with a uniform film thickness is formed on various substrates. It should be noted that, in a case where substrates are adhered to each other, the following may be performed. An adhesive is applied annularly or in spots to a first substrate, and a second substrate is superposed thereon. In this state, the substrates are rotated at high speed to spread the adhesive between the substrates, thereby forming a resin film R. At each time when the resin film R reaches a predetermined film thickness, annular light is irradiated through the second substrate as described above, thereby sequentially curing the resin film R. Moreover, the irradiation of the first light may be performed as described above, in a state where the rotation of the substrate is stopped or the rotation frequency is reduced, at the time when the resin film substantially reaches a uniform thickness up as far as the set position Y. At this time, the irradiation of the second light is as described above.

REFERENCE NUMERALS

1: Substrate
R: Resin Film
Ra: Light Irradiated Surface
Rb: Inner Periphery Edge of Resin Film
Rc: Thick Portion of Resin Film
3: Substrate Rotation Mechanism
5, 5A to 5E: Light-irradiating Mechanism
7: Control Mechanism
9: Rotation Axis
11: Rotational Drive Unit
13: Substrate Receiving Mount
15: Cover Member
17: Ultraviolet Light Source
19: Optical Fiber Cable
19A: Annular Tip Face of Optical Fiber
21, 21A to 21E: Light-irradiating Head
23: Head-lifting Device
23A: Connecting Member of Head-lifting Device
25, 25A: Annular-light-irradiating Portion 25a: Annular Portion of Annular-light-irradiating Portion
27: Lens Member
28: Focus-changing Portion
29: Center Pin31: First Annular-light-forming Portion
31A: Conical Inner Face
33: Second Annular-light-forming Portion
33A: Conical Outer Face
33B: Apex of Second Annular-light-forming Portion 33
35: First Reflection Member
35A: Apex of First Reflection Member
35B: Reflection Outer Face
37: Second Reflection Member
37A: Reflection Inner Face
37B: Central Hole of Second Reflection Member
38: Laser Source
39: Terminal Portion
41: Conical Lens
41A: Short Cylindrical Portion of Conical Lens
41B: Conical Portion of Conical Lens
41C: Conical Face of Conical Portion 41B
41D: Apex of Conical Portion 41B
43: Electric Power Supply for Laser
45A to 45L: Laser-beam-irradiating Means
47: Annular Member
49: Wiring
51: Angle Adjustment Device
53: Vertical Motion Member
55: Vertical Driving Member
57: Arm Piece
60: Parallel Displacement Mechanism
60A: Guide Member
60B: Displacement Member
60C: Connecting Member
70: Displacement and Angle Modification Mechanism
70A: Guide Member
70B: Displacement Member
70C: Connecting Member
70D: Angle Modification Member
70E: Fulcrum Shaft
E: Electric Supply Line
X: Rotation Center
Xa: Intersecting Point
OP: Annular Light
OP1: Light at Innermost Side of Annular Light
OP2: Light at Outermost Side of Annular Light
W: Width of Annular Light OP
W1: Inner Diameter of Annular Light OP
W2: Outer Diameter of Annular Light OP
D: Inner Diameter of Resin Film R
SP: Spin Pattern
VP: Ascending Speed Pattern
S: Gap between Conical Inner Face 31A and Conical Outer Face 33A
SE: Light Irradiation Hole
LED: Light Emitting Diode
Y: First (Set) Position of Resin Film R
U1: First Light
U2: Second Light
D: Inner Diameter of Resin Film R

What is claimed is:

1. A method for forming a resin film, comprising the steps of: providing an apparatus;
spreading a liquid material on a substrate or between substrates by rotating the substrate(s) using the apparatus;
during or after rotating, irradiating annular light from a central side to an outer circumferential side of the substrate(s) using the apparatus such that an inner diameter and an outer diameter of the annular light are increased concentrically in relation to a rotation center of the substrate(s) as irradiation time of the annular light progresses, so that an amount of light irradiation energy per unit area of surface to which the annular light is irradiated is uniform, such that the liquid material is cured;
wherein the apparatus comprising:
a substrate rotation mechanism for rotating the substrate(s), in which the liquid material for forming the resin film has been fed on the substrate or between the substrates;
a light-irradiating mechanism for curing the spread liquid material by irradiating light thereto during or after spreading the liquid material by rotation, and for shifting the irradiation of light from a central side to an outer circumferential side of the substrate(s), the light-irradiating mechanism comprising:
a light source for generating light to be irradiated to a light irradiated surface of the resin film;
a control unit for controlling start and stop of irradiating the light; and
a light-irradiating head that is provided with an annular-light-irradiating portion for changing the light from the light source into annular light; and
wherein the light-irradiating head is provided with a lens member for orienting the annular light at a predetermined angle phi formed with respect to a central axis of the rotation center, so that an amount of light irradiation energy per unit area of a surface to which the annular light is irradiated is uniform.

2. The method for forming a resin film according to claim 1, wherein a shifting speed of the inner diameter of the annular light is controlled to decrease from a rotation center side toward the outer circumferential side of the substrate(s), so that an amount of light irradiation energy per unit area of a surface to which the annular light is irradiated is uniform.

3. The method for forming a resin film according to claim 1, wherein an irradiation time period of the annular light is controlled to increase from a rotation center side toward the outer circumferential side of the substrate(s), so that an amount of light irradiation energy per unit area of a surface to which the annular light is irradiated is uniform.

4. The method for forming a resin film according to claim 1, wherein a luminous intensity of the annular light is controlled to increase from a rotation center side toward the outer circumferential side of the substrate(s), so that an amount of light irradiation energy per unit area of a surface to which the annular light is irradiated is uniform.

5. A method for forming a resin film, comprising the steps of: providing an apparatus;
spreading a liquid material on a substrate or between substrates by rotating the substrate(s) using the apparatus;
during or after rotating, irradiating light from a central side to an outer circumferential side of the substrate(s) using the apparatus, such that the liquid material is cured;
wherein the apparatus comprising:
a substrate rotation mechanism for rotating the substrate(s), in which the liquid material for forming the resin film has been fed on the substrate or between the substrates; and
a light-irradiating mechanism for curing the spread liquid material by irradiating light thereto during or after spreading the liquid material by rotation, and for shifting the irradiation of light from a central side to an outer circumferential side of the substrate(s), the light-irradiating mechanism comprising:
a light source for generating light to be irradiated to a light irradiated surface of the resin film;
a control unit for controlling start and stop of irradiating the light; and
a light intensity distribution modification mechanism for changing a gradient of an intensity distribution of the light;
wherein the light intensity distribution modification mechanism irradiates light with an intensity distribution with one gradient up as far as a second position that is inside a first position at the outer circumferential side where irradiation of the light is stopped, and shifts the light from a rotation center side to the outer circumferential side of the substrate(s), controls the light to a direction to increase the gradient of the intensity distribution at the second position, and irradiates light having an intensity distribution with another gradient steeper than the one gradient to the first position, so that a boundary between an area that is irradiated by the light and an area that is not irradiated by the light is made clear at a position at the outer circumferential side.

6. The method for forming a resin film according to claim 5, wherein a shifting speed from a rotation center side toward the outer circumferential side of the substrate(s) or irradiation time is controlled, so that an amount of light irradiation energy per unit area of a surface irradiated by the light is uniform.

7. An apparatus for forming a resin film, in which, during or after spreading a liquid material on a substrate or between substrates by rotating the substrate(s), irradiation of light is shifted from a central side to an outer circumferential side of the substrate(s), and the liquid material is cured, the apparatus comprising:
a substrate rotation mechanism for rotating the substrate(s), in which the liquid material for forming the resin film has been fed on the substrate or between the substrates; and
a light-irradiating mechanism for curing the spread liquid material by irradiating light thereto during or after spreading the liquid material by rotation,
the light-irradiating mechanism comprising:
a light source for generating light to be irradiated to a light irradiated surface of the resin film;
a control unit for controlling start and stop of irradiating the light; and
a light-irradiating head that is provided with an annular-light-irradiating portion for changing the light from the light source into annular light,
wherein the annular light is irradiated so that an inner diameter and an outer diameter of the annular light are increased concentrically in relation to a rotation center of the substrate(s) as irradiation time of the annular light progresses, and
wherein the light-irradiating head is provided with a lens member for orienting the annular light at a predetermined angle phi formed with respect to a central axis of the rotation center, so that an amount of light irradiation energy per unit area of a surface to which the annular light is irradiated is uniform.

8. An apparatus for forming a resin film, in which, during or after spreading a liquid material on a substrate or between substrates by rotating the substrate(s), irradiation of light is shifted from a central side to an outer circumferential side of the substrate(s), and the liquid material is cured, the apparatus comprising:
a substrate rotation mechanism for rotating the substrate(s), in which the liquid material for forming the resin film has been fed on the substrate or between the substrates; and
a light-irradiating mechanism for curing the liquid material spread by way of irradiating light thereto during or after spreading the liquid material by rotation,
the light-irradiating mechanism comprising:
a light-irradiating head for irradiating annular light formed by a plurality of light-irradiating means arranged annularly around a rotation center of the substrate(s);
a power source for feeding electric power to the light-irradiating means; and
an angle adjustment device for moving the light-irradiating means to change an angle thereof in relation to the rotation center,
wherein the angle adjustment device controls the angle of the light-irradiating means, so that an angle phi of light from the light-irradiating means formed with respect to a central axis of the rotation center is increased as irradiation time of the annular light progresses.

9. An apparatus for forming a resin film, in which, during or after spreading a liquid material on a substrate or between substrates by rotating the substrate(s), irradiation of light is shifted from a central side to an outer circumferential side of the substrate(s), and the liquid material is cured, the apparatus comprising:
a substrate rotation mechanism for rotating the substrate(s), in which the liquid material for forming the resin film has been fed on the substrate or between the substrates; and
a light-irradiating mechanism for curing the spread liquid material by irradiating light thereto during or after spreading the liquid material by rotation,
the light-irradiating mechanism comprising:
a light source for generating light to be irradiated to a light irradiated surface of the resin film;
a control unit for controlling start and stop of irradiating the light; and
a light intensity distribution modification mechanism for changing a gradient of an intensity distribution of the light,
wherein the light intensity distribution modification mechanism irradiates light with an intensity distribution with one gradient up as far as a second position that is inside a first position at the outer circumferential side where the irradiation of light is stopped, and shifts the light from a rotation center side to the outer circumferential side of the substrate(s), controls the light to a direction to increase the gradient of the intensity distribution at the second position, and irradiates light having an intensity distribution with another gradient steeper than the one gradient to the first position, so that a boundary between an area that is irradiated by the light and an area that is not irradiated by the light is made clear at a position at the outer circumferential side.

10. The apparatus for forming a resin film according to claim 9, wherein: the light intensity distribution modification mechanism further comprises a lens mechanism that moves in a direction perpendicular to the resin film to change a gradient of the intensity distribution of the light from the light source, the light shifting from the rotation center side to the outer circumferential side on the light irradiated surface, when the lens mechanism moves in a direction separating from the light irradiated surface, and the light intensity distribution modification mechanism controls the lens mechanism to narrow a focus of the light, so that the gradient of the intensity distribution of the light is made steeper at the second position.

11. The apparatus for forming a resin film according to claim 9, wherein: the light intensity distribution modification mechanism comprises: a lens mechanism for changing the gradient of the intensity distribution of the light from the light source; and a parallel displacement device for moving the light source and the lens mechanism parallel to the light irradiated surface, wherein: the parallel displacement device displaces the light source and the lens mechanism parallel to the resin film in a state where the substrate(s) is rotating, thereby shifting the light from the rotation center side to the outer circumferential side on the light irradiated surface, and the lens mechanism is controlled to start narrowing a focus of the light, so that the gradient of the intensity distribution of the light is made steeper at the second position.

12. The apparatus for forming a resin film according to claim 9, wherein: the light intensity distribution modification mechanism comprises a multi-directional displacement device for moving the light source in a parallel direction and a vertical direction in relation to the light irradiated surface, the multi-directional displacement device displaces the light source from the rotation center side to the outer circumferential side parallel to the resin film in a state where the substrate(s) is rotating, and the multi-directional displacement device is controlled to lower the light source to be closer to the resin film, so that the gradient of the intensity distribution of the light is made steeper at the second position.

13. The apparatus for forming a resin film according to claim 9, wherein: the light intensity distribution modification mechanism further comprises a displacement and angle modification device, which displaces the light source parallel to the light irradiated surface, and which can change a tilt angle of the light source in relation to the light irradiated surface, the displacement and angle modification device displaces the light source from the rotation center side to the outer circumferential direction parallel with the resin film, while tilting the light source at a predetermined angle in relation to the resin film, in a state where the substrate(s) is rotating, from the start of irradiation up as far as the second position that is inside the first position of the outer circumferential side where the irradiation of the light is stopped, and the displacement and angle modification device is controlled to change the tilt angle of the light source perpendicular to the light irradiated surface, so that the gradient of the intensity distribution of the light is made steeper at the second position.

* * * * *